US006865746B1

(12) United States Patent
Herrington et al.

(10) Patent No.: US 6,865,746 B1
(45) Date of Patent: Mar. 8, 2005

(54) ELECTRONIC PROGRAM GUIDE WITH RELATED-PROGRAM SEARCH FEATURE

(75) Inventors: W. Benjamin Herrington, Tulsa, OK (US); Michael D. Ellis, Boulder, CO (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 09/451,612

(22) Filed: Nov. 30, 1999

Related U.S. Application Data
(60) Provisional application No. 60/110,989, filed on Dec. 3, 1998.

(51) Int. Cl.[7] ........................ H04W 7/025; H04W 7/10; G06F 3/00; G06F 13/00
(52) U.S. Cl. ............................ 725/53; 725/13; 725/45; 725/47
(58) Field of Search ................................ 725/13, 45–47, 725/53, 43; 345/721

(56) References Cited

U.S. PATENT DOCUMENTS

| | | | |
|---|---|---|---|
| 4,081,753 A | 3/1978 | Miller | 325/396 |
| 4,170,782 A | 10/1979 | Miller | 358/84 |
| 4,271,532 A | 6/1981 | Wine | 455/186 |
| 4,367,559 A | 1/1983 | Tults | 455/186 |
| 4,375,651 A | 3/1983 | Templin et al. | 358/191.1 |
| 4,381,522 A | 4/1983 | Lambert | 358/86 |
| 4,390,901 A | 6/1983 | Keiser | 358/147 |
| 4,425,579 A | 1/1984 | Merrell | 358/86 |
| 4,429,385 A | 1/1984 | Cichelli et al. | 370/92 |
| 4,495,654 A | 1/1985 | Deiss | 455/151 |
| 4,527,194 A | 7/1985 | Sirazi | 358/86 |
| 4,641,205 A | 2/1987 | Beyers, Jr. | 360/33.1 |
| 4,689,022 A | 8/1987 | Peers et al. | 434/307 |
| 4,754,326 A | 6/1988 | Kram et al. | 364/900 |
| 4,908,713 A | 3/1990 | Levine | 358/335 |

(List continued on next page.)

FOREIGN PATENT DOCUMENTS

| | | | |
|---|---|---|---|
| DE | 36 40 436 C2 | 6/1988 | H04N/5/087 |
| DE | 42 17 246 A1 | 12/1993 | H04N/7/087 |
| DE | 4240187 A1 | 6/1994 | H04N/5/445 |

(List continued on next page.)

OTHER PUBLICATIONS

Brugliera, Vito, "Digital On–Screen Display: A New Technology for the Consumer Interface" (Jun., 1993).
"DIRECTV Plus² System", Thompson Consumer Electronics, Inc. (1999).
"TV Guide movie database" Internet web pages printed on Aug. 12, 1999 (9 pages).

*Primary Examiner*—Vivek Srivastava
*Assistant Examiner*—Matthew Demicco
(74) *Attorney, Agent, or Firm*—Fish & Neave

(57) ABSTRACT

A system for searching for programs is provided. The system may provide the user with an opportunity to indicate an interest in a given program. The system may provide the user with an opportunity to request that the system locate programs that are related to the given program in which the user has indicated an interest. The system may locate program listings that are related to the given program. The located program listings may be related to the given program based on attributes of the given program. The system may display a list of located listings and allow the user to select listings from the list. The system may tune to a program selected from the list, may display an information display screen for a program selected from the list, etc. The system may provide the user with an opportunity to configure and save search parameters. The system may sort related program listings based on the attributes of the given program. The system may provide the user with the opportunity to retrieve saved searches to locate currently available program listings and the opportunity to delete a saved search, rename, a saved search, receive automatic notifications of programs matching a saved search, etc.

32 Claims, 20 Drawing Sheets

U.S. PATENT DOCUMENTS

| | | | |
|---|---|---|---|
| 4,963,994 A | 10/1990 | Levine | 358/335 |
| 5,038,211 A | 8/1991 | Hallenbeck | 358/142 |
| 5,047,867 A | 9/1991 | Strubbe et al. | 358/335 |
| 5,075,771 A | 12/1991 | Hashimoto | 358/84 |
| 5,210,611 A | 5/1993 | Yee et al. | 358/191.1 |
| 5,223,924 A | 6/1993 | Strubbe | 358/86 |
| 5,317,403 A | 5/1994 | Keenan | 348/731 |
| 5,323,240 A | 6/1994 | Amano et al. | 348/731 |
| 5,410,344 A | 4/1995 | Graves et al. | 348/1 |
| 5,432,561 A | 7/1995 | Strubbe | 348/565 |
| 5,444,499 A | 8/1995 | Saitoh | 348/734 |
| 5,465,113 A | 11/1995 | Gilboy | 725/25 |
| 5,465,385 A | 11/1995 | Ohga et al. | 455/6.1 |
| 5,477,262 A | 12/1995 | Banker et al. | 348/7 |
| 5,481,296 A | 1/1996 | Cragun et al. | 348/13 |
| 5,483,278 A | 1/1996 | Strubbe et al. | 725/61 |
| 5,534,911 A | 7/1996 | Levitan | 348/1 |
| 5,585,866 A | 12/1996 | Miller et al. | 348/731 |
| 5,589,892 A | 12/1996 | Knee et al. | 348/731 |
| 5,600,364 A | 2/1997 | Hendricks et al. | 348/1 |
| 5,617,565 A | 4/1997 | Augenbraum et al. | 395/604 |
| 5,621,456 A | 4/1997 | Florin et al. | 348/7 |
| 5,694,176 A | 12/1997 | Bruette et al. | 348/563 |
| 5,731,844 A | 3/1998 | Rauch et al. | 348/563 |
| 5,752,160 A | 5/1998 | Dunn | 455/5.1 |
| 5,774,357 A | 6/1998 | Hoffberg et al. | 364/188 |
| 5,798,785 A | 8/1998 | Hendrick et al. | 348/1 |
| 5,801,747 A | 9/1998 | Bedard | 348/1 |
| 5,822,123 A | 10/1998 | Davis et al. | 348/564 |
| 5,848,396 A | 12/1998 | Gerace | 705/10 |
| 5,867,226 A | 2/1999 | Wehmeyer | 725/46 |
| 5,875,108 A | 2/1999 | Hoffberg et al. | 364/146 |
| 5,880,768 A | 3/1999 | Lemmons et al. | 348/1 |
| 5,903,545 A | 5/1999 | Sabourin et al. | 370/225 |
| 5,973,683 A | 10/1999 | Cragun et al. | 345/327 |
| 5,977,964 A | 11/1999 | Williams et al. | 345/327 |
| 6,005,565 A * | 12/1999 | Legall et al. | 345/721 |
| 6,005,597 A | 12/1999 | Barrett et al. | 725/9 |
| 6,008,802 A * | 12/1999 | Iki et al. | 345/327 |
| 6,029,195 A | 2/2000 | Herz | 709/219 |
| 6,075,526 A * | 6/2000 | Rothmuller | 345/327 |
| 6,081,750 A | 6/2000 | Hoffberg et al. | 700/17 |
| 6,088,722 A | 7/2000 | Herz et al. | 709/217 |
| 6,133,909 A * | 10/2000 | Schein et al. | 345/721 |
| 6,163,316 A | 12/2000 | Killian | 345/327 |
| 6,172,674 B1 | 1/2001 | Etheredge | 345/327 |
| 6,177,931 B1 | 1/2001 | Alexander et al. | 345/327 |
| 6,181,335 B1 | 1/2001 | Hendricks et al. | 345/328 |
| 6,216,264 B1 * | 4/2001 | Maze et al. | 725/53 |
| 6,437,836 B1 | 8/2002 | Huang et al. | 348/734 |
| 6,505,348 B1 | 1/2003 | Knowles et al. | 725/49 |

FOREIGN PATENT DOCUMENTS

| | | | | |
|---|---|---|---|---|
| EP | 0 721 253 A2 | 7/1996 | | H03J/1/04 |
| EP | 0 774 866 A2 | 5/1997 | | H04N/5/44 |
| EP | 0 854 645 A2 | 7/1998 | | H04N/5/445 |
| GB | 1 554 411 | 10/1979 | | H04B/3/54 |
| WO | WO 86/01359 | 2/1986 | | H04N/5/445 |
| WO | WO 89/03085 | 4/1989 | | G06F/7/04 |
| WO | WO 94/13107 | 6/1994 | | H04N/7/16 |
| WO | WO 94/14284 | 6/1994 | | H04N/7/16 |
| WO | WO 95/26608 | 10/1995 | | H04N/7/087 |
| WO | WO 95/28799 | 10/1995 | | H04N/1/00 |
| WO | WO 96/17473 | 6/1996 | | H04N/5/445 |
| WO | WO 96/41478 | 12/1996 | | H04N/7/173 |
| WO | WO 97/48230 | 12/1997 | | H04N/7/00 |
| WO | WO 97/49242 | 12/1997 | | H04N/7/10 |
| WO | WO 98/26584 | 6/1998 | | H04N/5/445 |
| WO | WO 98/43183 | 10/1998 | | G06F/17/30 |
| WO | WO 98/48566 | 10/1998 | | |
| WO | WO 99/01984 | 1/1999 | | H04N/7/173 |
| WO | WO 99/14947 | 3/1999 | | H04N/5/445 |
| WO | WO-9945701 A1 * | 9/1999 | | H04N/5/445 |
| WO | WO 99/45701 | 9/1999 | | H04N/5/445 |
| WO | WO 00/04708 | 1/2000 | | H04N/5/445 |
| WO | WO 00/05889 | 2/2000 | | H04N/7/16 |
| WO | WO 00/28734 | 5/2000 | | H04N/5/445 |

* cited by examiner

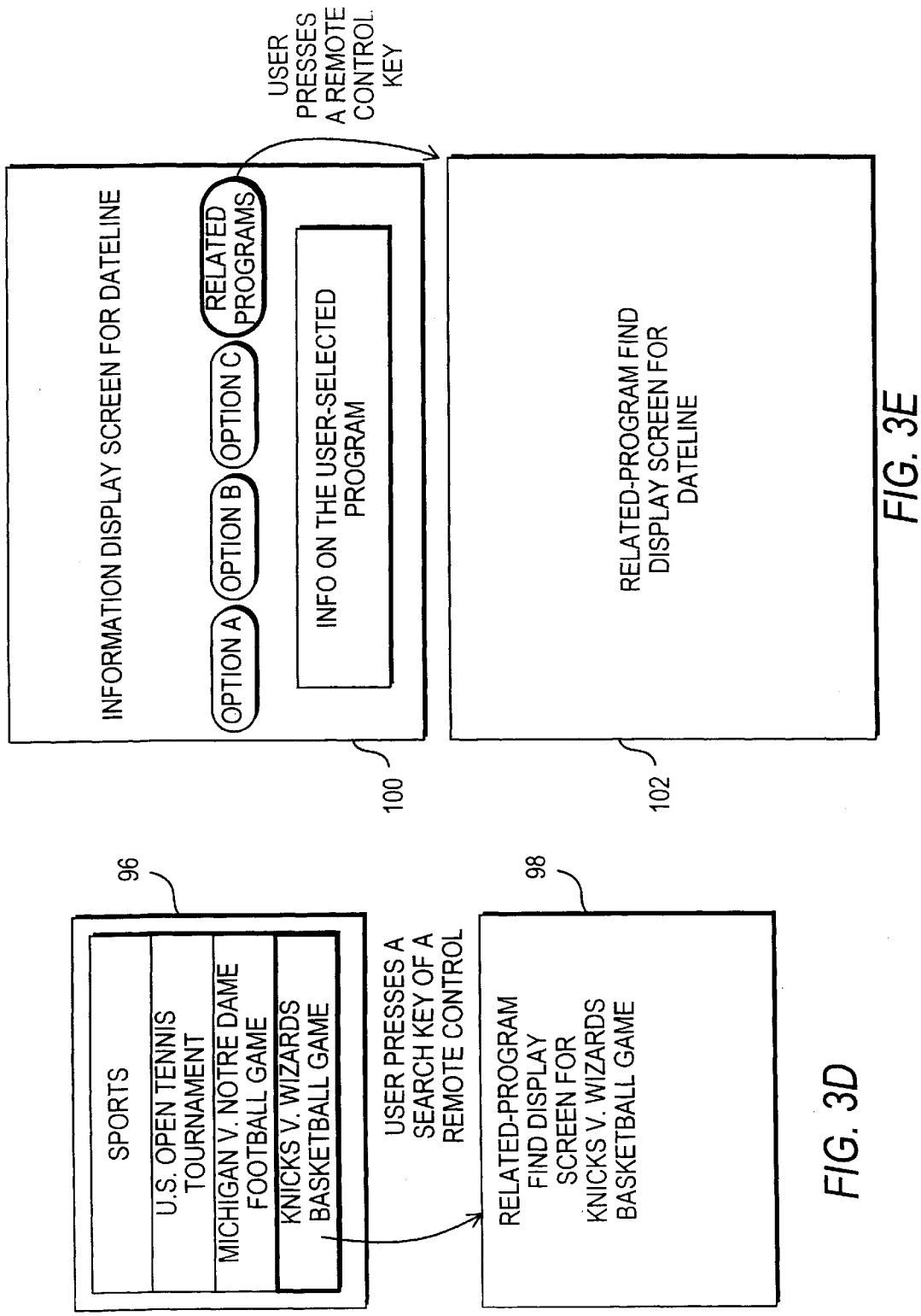

ELECTRONIC PROGRAM GUIDE WITH RELATED-PROGRAM SEARCH FEATURE

RELATED-PROGRAM SEARCH FEATURE

This application claims the benefit of U.S. provisional application No. 60/110,989, filed Dec. 3, 1998.

BACKGROUND OF THE INVENTION

This invention relates to interactive television systems such as interactive television program guide systems, and more particularly, to techniques for program searching in these systems.

Cable, satellite, and broadcast television systems provide a large number of television channels. Typically, the number of channels provided by cable and satellite systems is over a hundred and ever increasing. Television viewers have traditionally consulted printed television program schedules to obtain programing information. More recently, interactive electronic television program guides have been developed to allow television program information to be displayed on viewer television equipment.

Interactive electronic television program guides ("program guides") typically provide program listings for all channels available in the television system. Some program guides include features for allowing users to search for programs. Such search features are often complex, time-consuming, and cumbersome. For example, such search features may require that a user select search parameters such as preferred programming genres before searching for programs, that a user navigate through several display screens before being allowed to initiate a search, that the user enter at least a portion of a program title to initiate a search, etc.

It is therefore an object of the present invention to provide a television system that includes an improved program searching feature.

SUMMARY OF THE INVENTION

These and other objects of the invention are accomplished in accordance with the principles of the present invention by providing a system for searching for programs. The system may provide the user with an opportunity to indicate an interest in a given program. The system may provide the user with an opportunity to request that the system locate programs that are related to the given program in which the user indicated an interest. The system may locate program listings that are related to the given program. The located program listings may be related to the given program based on attributes of the given program.

The system may display a list of the located program listings. The system may provide the user with an opportunity to select from the list of related programs. The system may tune to a program selected from the list, may display an information display screen for a program selected from the list, etc.

The system may provide the user with an opportunity to configure search parameters. For example, The system may present the user with a list of attributes for the given program and may allow the user to select one or more attributes and may allow the user to select which logical operations (e.g., and/or operations) are to be performed on the attributes. The system may search television program listings and may display a list of related programs based on the selected attributes.

The system may sort related program listings based on the attributes of the given program. The system may provide the user with an opportunity to save search parameters for use at a later time. The system may display a list of previously saved searches and may provide the user with an opportunity to direct the system to locate currently available program listings based on a saved search from the list. The system may locate currently available listings based on the user-selected search parameters from the saved search when the saved search is retrieved. The system may allow the user to delete a saved search. The system may automatically display a notification based on user-selected search parameters from a saved search. The system may provide the user with an opportunity to view the user-selected search parameters for a saved search.

Further features of the invention, its nature and various advantages will be more apparent from the accompanying drawings and the following detailed description of the preferred embodiments.

BRIEF DESCRIPTION OF THE DRAWINGS

FIG. 3d is a diagram of an illustrative sequence of illustrative display screens for providing an opportunity to request that the system locate programs that are related to a given program in accordance with the present invention.

FIG. 3e is a diagram of an illustrative sequence of illustrative display screens for providing an opportunity to request that the system locate programs that are related to a given program in accordance with the present invention.

DETAILED DESCRIPTION OF THE PREFERRED EMBODIMENTS

Figure 1:
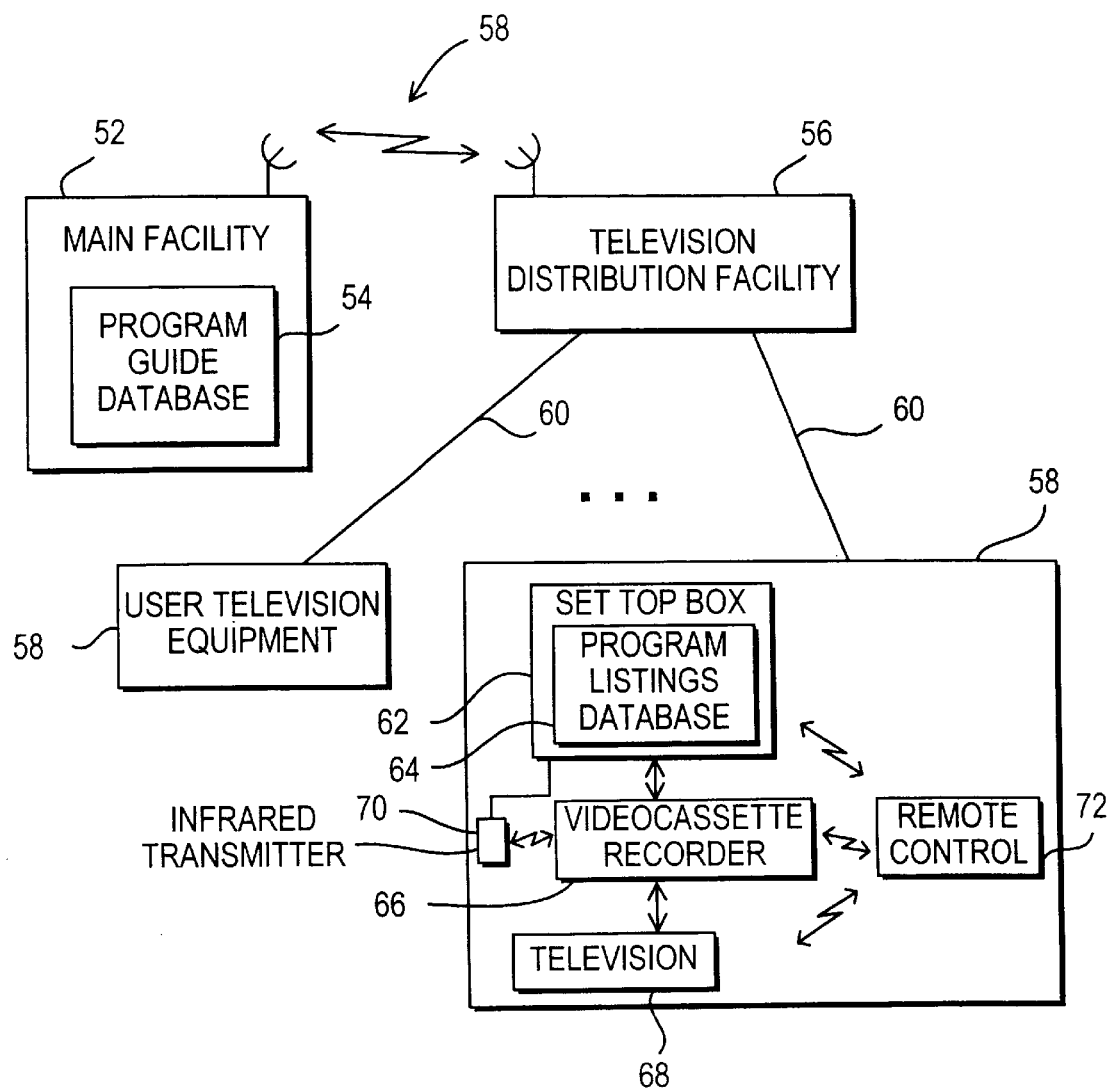
FIG. 1 is a diagram of an illustrative interactive television program guide system in accordance with the present invention.

An illustrative interactive television program guide system 50 in accordance with the present invention is shown in FIG. 1. Main facility 52 includes a program guide database 54 for storing program guide information (e.g., television program listings data, program-related information, service listings data, service-related information, pay-per-view ordering information, television program promotional information, etc.).

Main facility 52 preferably includes a processor to handle information distribution tasks. Information from database 54 may be transmitted in parallel via communications links such as communications link 58 to multiple television distribution facilities such as television distribution facility 56. Only one television distribution facility is shown in FIG. 1 to avoid over complicating the drawings. Each communications link 58 may be a satellite link, a telephone network link, a combination of such links, or another suitable communications path. Text, graphics, and video data signals may be transmitted over link 58. If it is desired to transmit video signals over communications link 58, a relatively high bandwidth link such as a satellite link is generally preferable to a relatively low bandwidth link such as a telephone line.

Television distribution facility 56 is a facility such as a cable system headened, a broadcast distribution facility, or a satellite television distribution facility for distributing television signals to viewers.

The program guide information transmitted by main facility 52 to television distribution facility 56 includes television program listings data such as program times, channels, titles, descriptions, program type, genre, actors, etc. Transmitted program guide information may include pay program data such as pricing information for individual programs and subscription channels, time windows for ordering programs and channels, telephone numbers for placing orders that cannot be impulse ordered, etc.

Television distribution facility 56 may distribute program guide information received from main facility 52 to user television equipment 58 via communications paths 60. User television equipment 58 may be any suitable equipment for providing television that contains sufficient processing capabilities to monitor viewing activities, analyze these activities and display appropriate program listings information for the user.

Communications paths 60 may be cable links, fiber optic links, satellite links, broadcast links, or other suitable link, or a combination of such links. Any suitable communications scheme may be used to transmit data over paths 60, including in-band transmissions, out-of-band transmissions, digital transmissions, analog transmissions, cable transmissions, satellite transmissions, over-the-air transmissions, multichannel multipoint distribution services (MMDS) transmissions, etc.

Communications paths 60 preferably have sufficient bandwidth to allow television distribution facility 56 to distribute television programming, program listings information, advertisements, and other information to user television equipment 58. Multiple television and audio channels (analog, digital, or both analog and digital) may be provided to user television equipment 58 via communication paths 60. If desired, some of the data may be distributed to user television equipment 58 by one or more distribution facilities that are separate from television distribution facility 56 using communication paths that are at least partly separate from communication paths 60.

The data distribution technique that is used to distribute data on paths 60 may depend on the type of information that is being distributed. For example, text and graphics may be distributed over an out-of-band channel using an out-of-band modulator or distributed in the vertical blanking interval lines of an analog video channel. Video information may also be distributed in this way, although large quantities of video information may be more efficiently distributed using one or more digital channels or streams on paths 60. Such digital channels or streams may also be used for distributing text and graphics.

Each user television equipment device 58 has a receiver which is typically a set-top box such as set-top box 62. The receiver may also be other suitable television equipment such as an advanced television receiver into which circuitry similar to set-top-box circuitry has been integrated or a personal computer television (PC/TV). For illustrative purposes, the present invention will be described in the context of user television equipment 58 that uses set-top boxes.

Each set-top box 62 is typically connected to an optional videocassette recorder 66 so that selected television programs may be recorded. Videocassette recorder 66 is typically connected to a television 68. To record a program, set-top box 62 tunes to a particular channel and sends control signals to videocassette recorder 66 (e.g., using infrared transmitter 70) that instructs videocassette recorder 66 to start and stop recording at the appropriate times.

Television program listings, advertisements, programming information, and other information may be displayed on television 68. Each set-top box 62, videocassette recorder 66, and television 68 can be controlled by one or more remote controls 70 or any other suitable user input interface, such as a wireless keyboard, mouse, trackball, dedicated set of buttons, touch screen display remote, etc. Remote controls, such as remote control 70, have various buttons that can be pressed by the user such as arrow keys (e.g., for directing on-screen movement of a highlight region, for directing scrolling functions, etc.), an OK, select, enter, or other such selection key for making a selection (hereinafter referred to as an OK key), channel number keys (for selecting a television channel), a favorites key (to invoke functions related to user preferences), a delete key (to delete menu items or to express a disinterest in certain user preferences), an information key for receiving information on a program (hereinafter referred to as an INFO key), a specific feature key (e.g., a related-program search key to invoke program searching), etc. For illustrative purposes, many aspects of the present are discussed primarily in the context of a user interface being a remote control.

Certain program guide features, such as pay program purchasing, the purchasing of products or services, and data collection functions, may require that user television equipment 58 transmit data to television distribution facility 56 over communications paths 60. If desired, such data may be transmitted over telephone lines or other separate communications paths. If features such as these are provided using facilities separate from television distribution facility 56, some of the communications involving user television equipment 58 may be made directly with the separate facility (not shown).

If desired, an interactive television program guide system may be implemented using a data-relay architecture. In such an architecture, television distribution facility 56 may serve as a data relay site and user television equipment 58 may be a data destination site. For example, as television distribution facility 56 receives information from main facility 52, television distribution facility 56 may continuously or periodically distribute information to user television equipment 58. In a data-relay architecture, a program guide implemented on user television equipment 58 may use a database (e.g., database 64) for storing program guide information at user television equipment. Program guide information may include program listings and program attributes. Program attributes may be information such as program title, program actors, program duration, program genre (e.g., sports, comedy, movies, etc.), program channel, scheduled program duration, program rating (e.g., TV-G, PG-13, etc.), program content rating (or critics' rating or star rating, e.g., one star, two stars, etc.) and other related parameters that can be tagged to a program. Television distribution facility 56 may also poll set-top boxes periodically for certain information (e.g., pay program account information or information regarding programs that have been purchased and viewed using locally-generated authorization techniques).

The features of the present invention may be implemented in a client-server arrangement or in a combination client-server and data-relay arrangement. In such arrangements, the server (e.g., television distribution facility 56) may include a database that may include program listing information.

For clarity, the present invention is sometimes described primarily in the context of program guides that are implemented on user television equipment rather than in the context of program guides that are implemented partially on a server and partially on user television equipment or a more fully server-based architecture.

Each set-top box 62 preferably contains a processor to handle tasks associated with implementing an application on the set-top box 62 that assists the user in searching for programs. For example, a standalone application may be provided that supports program searching, as described more fully below. If desired, these tasks may be implemented using a program guide application. For clarity, the present invention will be described primarily in the context of such a program guide application and in the context of a program guide system.

Figure 2:
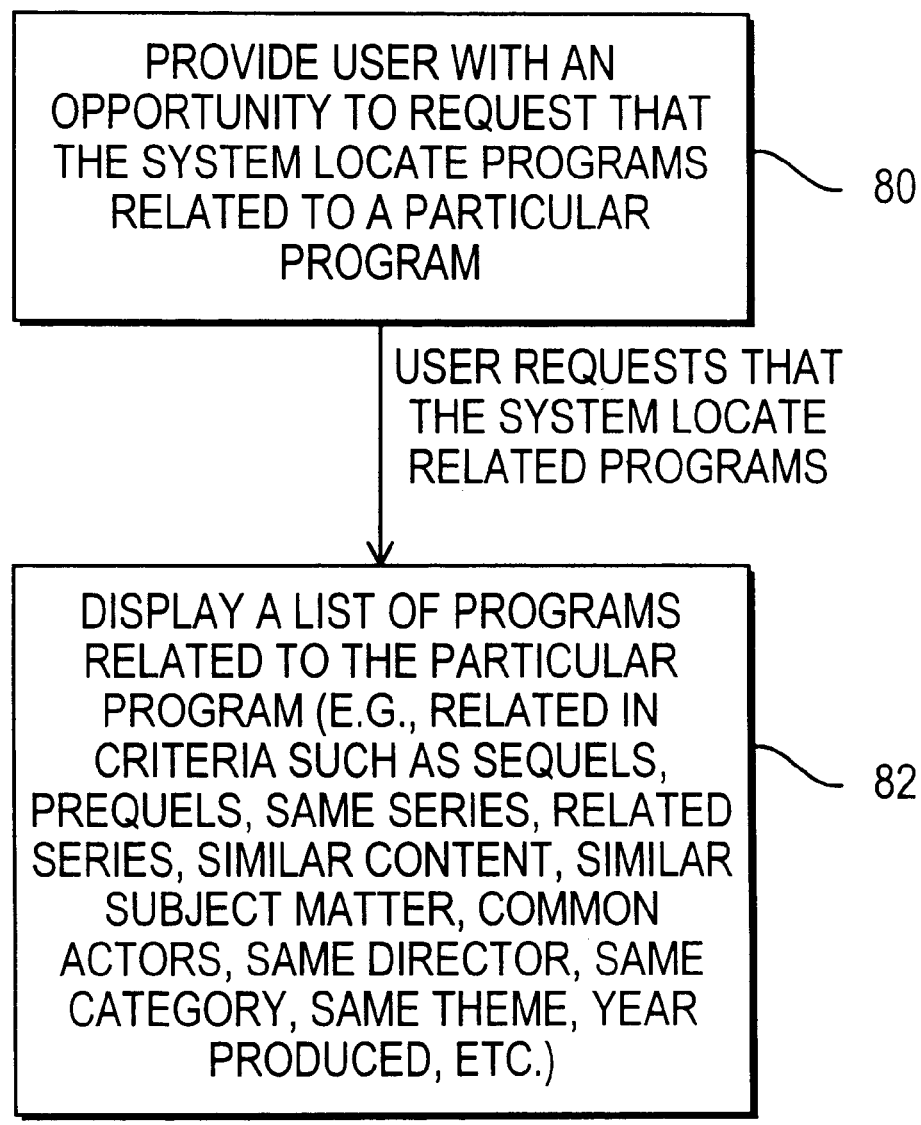
FIG. 2 is a flow chart of illustrative steps involved in providing program searching in accordance with the present invention.

Illustrative steps involved in providing program searching in an interactive television system such as interactive television program guide system 50 of FIG. 1 are shown in FIG. 2. Initially at step 80, the program guide may provide a user with an opportunity to request that the system locate programs that are related to a particular program (e.g., a program in which the user has indicated an interest using the system). The program guide may, at step 82, display a list of programs that are related to the particular program when the user requests that the system locate programs that are related to the particular program. The program guide may include programs in the list based on criteria, such as whether a program is related in attribute to the particular program, whether a program is a sequel or prequel of the particular program, whether a program is in the same program series as the particular program, whether a program is a series that is related to the particular program, whether a program is related the user-selected program in content or subject matter, whether a program has the same actor(s), director, category, theme, or production year as the user-selected program, etc.

Figure 3A:
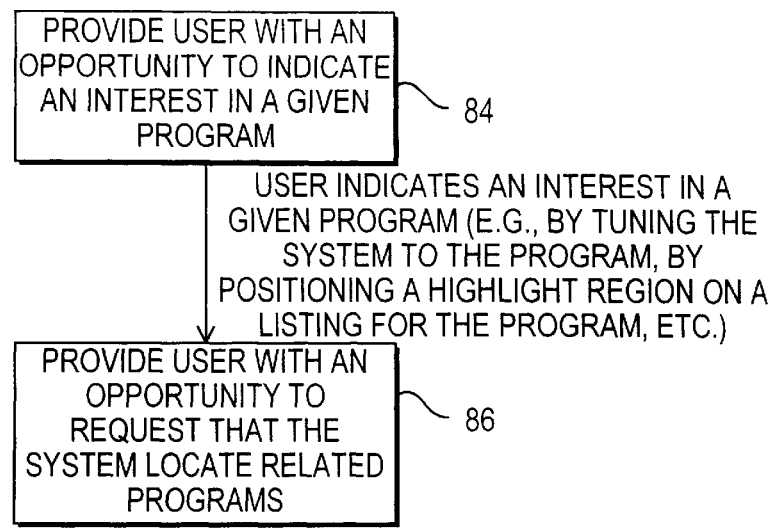
FIG. 3a is a flow chart of illustrative steps involved in providing an opportunity to request that the system locate programs related to a given program in accordance with the present invention.

Illustrative steps involved in providing a user with an opportunity to request that a system locate programs related to a given program in an interactive television system such as interactive television program guide system 50 of FIG. 1 are shown in FIG. 3a. At step 84, the program guide may provide a user with an opportunity to indicate an interest in a given program. The user may indicate an interest in the given program by, for example, positioning a highlight region on a program listing for the given program, tuning the system to the given program, selecting that an information display screen for the given program be displayed, etc. At step 86, the program guide may provide the user with an opportunity to request that the system locate programs that are related to the given program.

Figures 3B, 3C:
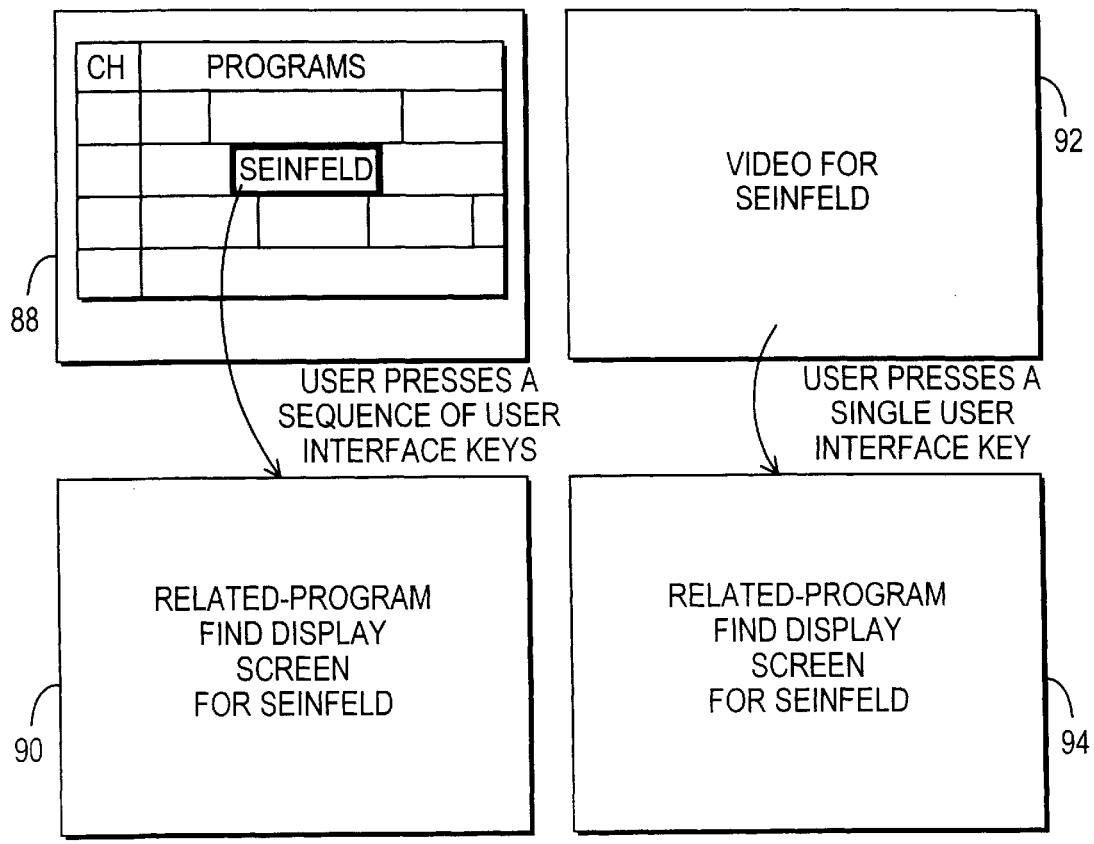
FIG. 3b is a diagram of an illustrative sequence of illustrative display screens for providing an opportunity to request that the system locate programs that are related to a given program in accordance with the present invention.
FIG. 3c is a diagram of an illustrative sequence of illustrative display screens for providing an opportunity to request that the system locate programs that are related to a given program in accordance with the present invention.

Illustrative display screens of FIG. 3b, FIG. 3c, FIG. 3d, and FIG. 3e may be provided based on the illustrative steps of FIG. 3a. As shown in FIG. 3b, the program guide may display related program find display screen 94 for the program Seinfeld when a user presses a single user interface key while a video for Seinfeld is displayed in display screen 92. The single user interface key may, for example, be a search key of a remote control for requesting that the system locate related programs.

If desired, as shown in FIG. 3c, the program guide may display related-program find display screen 90 for the program Seinfeld when the user presses a predetermined sequence of user interface keys after navigating a highlight region on a listing for Seinfeld in program listings display screen 88. The predetermined sequence of user interface keys may, for example, be pressing a search key and an OK key of a remote control.

A sequence of keys may be used when the user interface device (e.g., a remote control) does not have a key dedicated to providing the user with an opportunity to request that the system locate related programs.

If desired, as shown in FIG. 3d, the program guide may display related-program find display screen 98 for the Knicks v. Wizards basketball game when the user presses a search key of a remote control after navigating a highlight region on the listing for the Knicks v. Wizards basketball game in sports category program listings display screen 96.

If desired, as shown in FIG. 3e, the program guide may display related-program find display screen 102 for Dateline when a user presses a remote control OK key after navigating a highlight region on related programs option 104 of information display screen 100 for Dateline. The program guide may have displayed information display screen 100 for Dateline when, for example, the user pressed an OK key of a remote control after navigating a highlight region on a Dateline program listing, the user pressed an INFO key when video for Dateline is being displayed, etc. Examples of program guide systems with information display screen capabilities are provided in Rudnick et al., U.S. patent application Ser. No. 09/356,268 filed Jul. 16, 1999, which is hereby incorporated by reference herein in its entirety.

Figure 4:
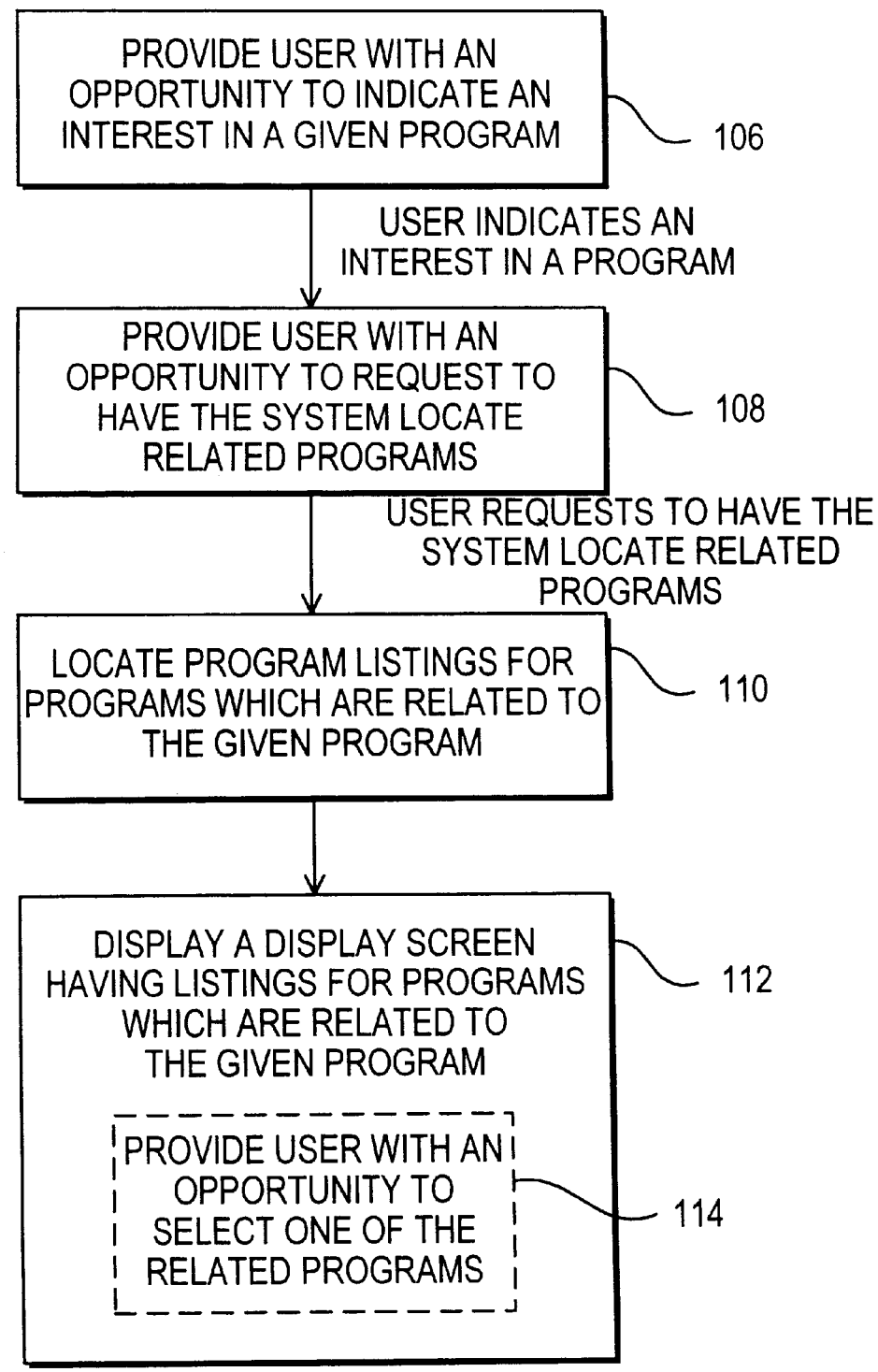
FIG. 4 is a flow chart of illustrative steps involved in displaying program listings that are related to a given program in accordance with the present invention.

Illustrative steps involved in displaying program listings that are related to a given program in an interactive television system such as interactive television program guide system 50 of FIG. 1 are shown in FIG. 4. At step 106, the program guide may provide the user with an opportunity to indicate an interest in a given program. At step 108, when the user indicates an interest in the given program, the program guide may provide the user with an opportunity to request that the system locate programs that are related to the given program.

At step 110, the program guide may locate program listings (e.g., program listings stored in a program guide database, such as database 64 of FIG. 1) that are related to the given program. The program guide may locate program listings based on attributes of the given program. For example, the program guide may locate program listings for programs that have an attribute that matches an attribute of the given program (e.g., a common actor, same content, same subject matter, same series, common director, same category, same theme, common production year, etc.), program listings for programs that have a plurality of attributes matching attributes of the given program, program listings for programs that have attributes that are related to the attributes of the given program (e.g., prequels, sequels, similar content, similar subject matter, related series, etc.), etc.

At step 112, the program guide may display a display screen (or, if desired, an overlay) having listings for programs which are related to the user-selected program. From the list, the user may find a particular program of interest to the user. The program guide may provide the user with an opportunity to select a program listing from the list at step 114.

Figure 5:
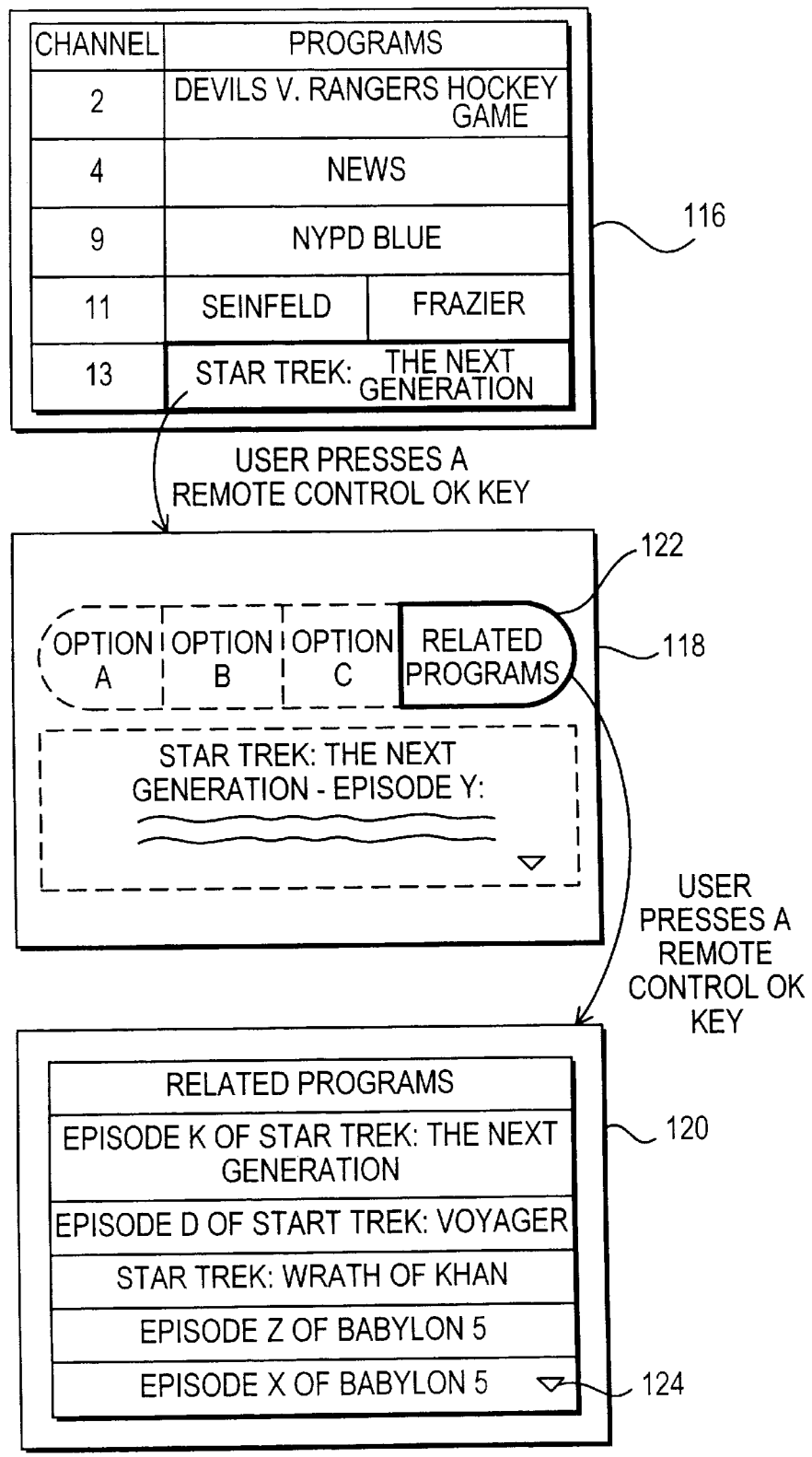
FIG. 5 is a diagram of an illustrative sequence of illustrative display screens for displaying program listings that are related to a given program in accordance with the present invention.

Illustrative program listings display screen 116, illustrative information display screen 118, and illustrative related-program find display screen 120 of FIG. 5 may be provided based on the illustrative steps of FIG. 4. The program guide may display information display screen 118 for Star Trek: The Next Generation-Episode Y when a user selects a listing for Star Trek: The Next Generation Episode Y in program listings display screen 116 (e.g., by pressing an INFO key when a highlight region is positioned on that listing). Information display screen 118 may include a related programs options 122 for requesting to find programs related to Star Trek: The Next Generation—Episode Y.

The program guide may display related program find display screen 120 when a user selects the related programs option 122 from information display screen 118. Related-program find display screen 120 includes a list of programs related to Star Trek: The Next Generation—Episode Y that contains: Episode K of Star Trek: The Next Generation, Episode D of Star Trek: Voyager., Star Trek: Wrath of Khan, Episode Z of Babylon 5, Episode X of Babylon 5, etc. The list may have been sorted based on attributes that were used by the program guide to locate the displayed program listings. For example, the list may have been sorted based on which attribute caused the match, or for example, based on how many attributes matched. Related-program find display screen 120 may include an indicator, such as arrow 124, to inform the user that the list may be scrolled to display further listings for related programs that are not currently displayed. Such an indicator may be used when there is insufficient space for displaying all the related programs in a related program find display screen.

Figure 6:
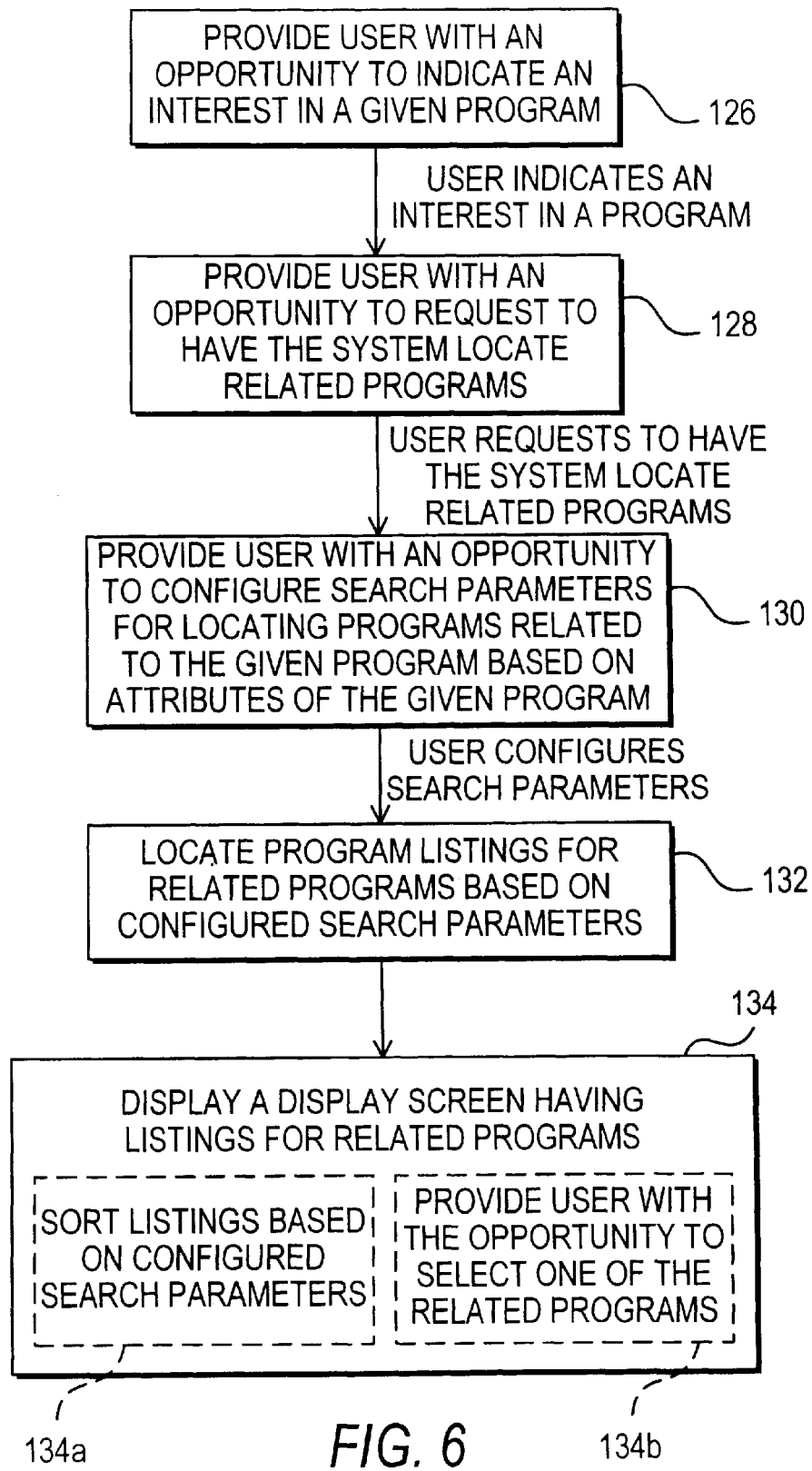
FIG. 6 is a flow chart of illustrative steps involved in displaying program listings that are related to a given program based on user-selected search parameters in accordance with the present invention.

Illustrative steps involved in displaying program listings that are related to a given program based on user-configured search parameters in an interactive television system such as interactive television program guide system 50 of FIG. 1 are shown in FIG. 6. Steps 126 and 128 are the same as steps 106 and 108 of FIG. 4, respectively, and are discussed above. At step 130 of FIG. 6, when the user requests that the system locate programs that are related to a given program, the program guide may provide the user with an opportunity to configure search parameters for searching for related programs based on attributes of the user-selected program. At step 132, the program guide may then locate program listings based on the user-configured search parameters. The program guide may locate program listings from program listings stored in a database, such as program listings database 64 FIG. 1. The location of the program listings database may depend on the communications arrangement of the interactive television program guide system (e.g., in a client-server arrangement at least part of the database may be located at a television distribution facility). At step 134, the program guide may display a display screen including on-screen listings for programs that are related to the given program based on the user-configured search parameters. At step 134a, the program guide may sort the located listings for display based on the user-configured search parameters. At step 134b, the program guide may provide the user with an opportunity to select one of the displayed programs listings.

Figure 7A:
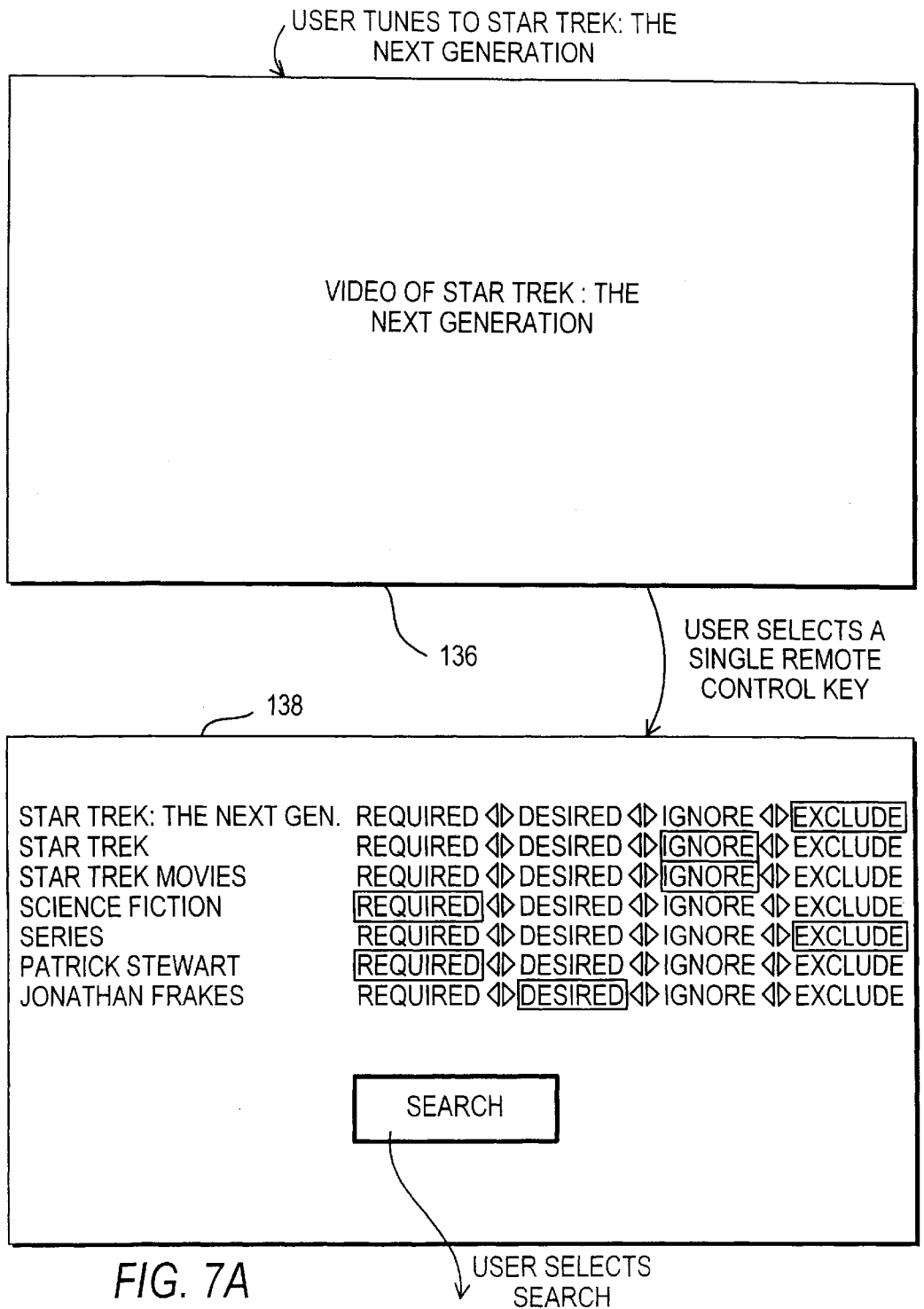
FIG. 7a is a diagram of an illustrative sequence of illustrative display screens for searching for program listing that are related to a given program based on user-selected search parameters in accordance with the present invention.

Illustrative display screen 136 and illustrative related-program find search configuration display screen 138 (hereinafter, configuration display screen 138) of FIG. 7a may be provided based on the illustrative steps of FIG. 6. The program guide may display configuration display screen 138 for an episode of Star Trek: The Next Generation when a user presses a single key of a remote control while a video for that episode of Star Trek: The Next Generation is being displayed. Configuration display screen 138 may contain an on-screen list of attributes for the given program, Star Trek: The Next Generation. The configuration display screen 138 may contain options for providing the user with an opportunity to assign various importance levels to the on-screen program attributes. The option may provide the user with an opportunity to assign different importance levels such as required, desired, ignored, or excluded to the program attributes.

Configuration display screen 138 shows that importance levels may be assigned to the program attributes for the given episode of Star Trek: The Next Generation so that when locating related program listings, the program guide excludes programs that are Star Trek: The Next Generation, ignores whether a program is a Star Trek program when deciding whether it matches, ignores whether a program is a Star Trek movie when deciding whether it matches, requires matching programs to be science fiction, requires matching programs to have Patrick Stewart. Configuration display screen 138 may include a search option that may provide the user with an opportunity to direct the program guide system to locate program listings related to the given program based on the program attributes and their assigned importance levels.

Figure 7B:
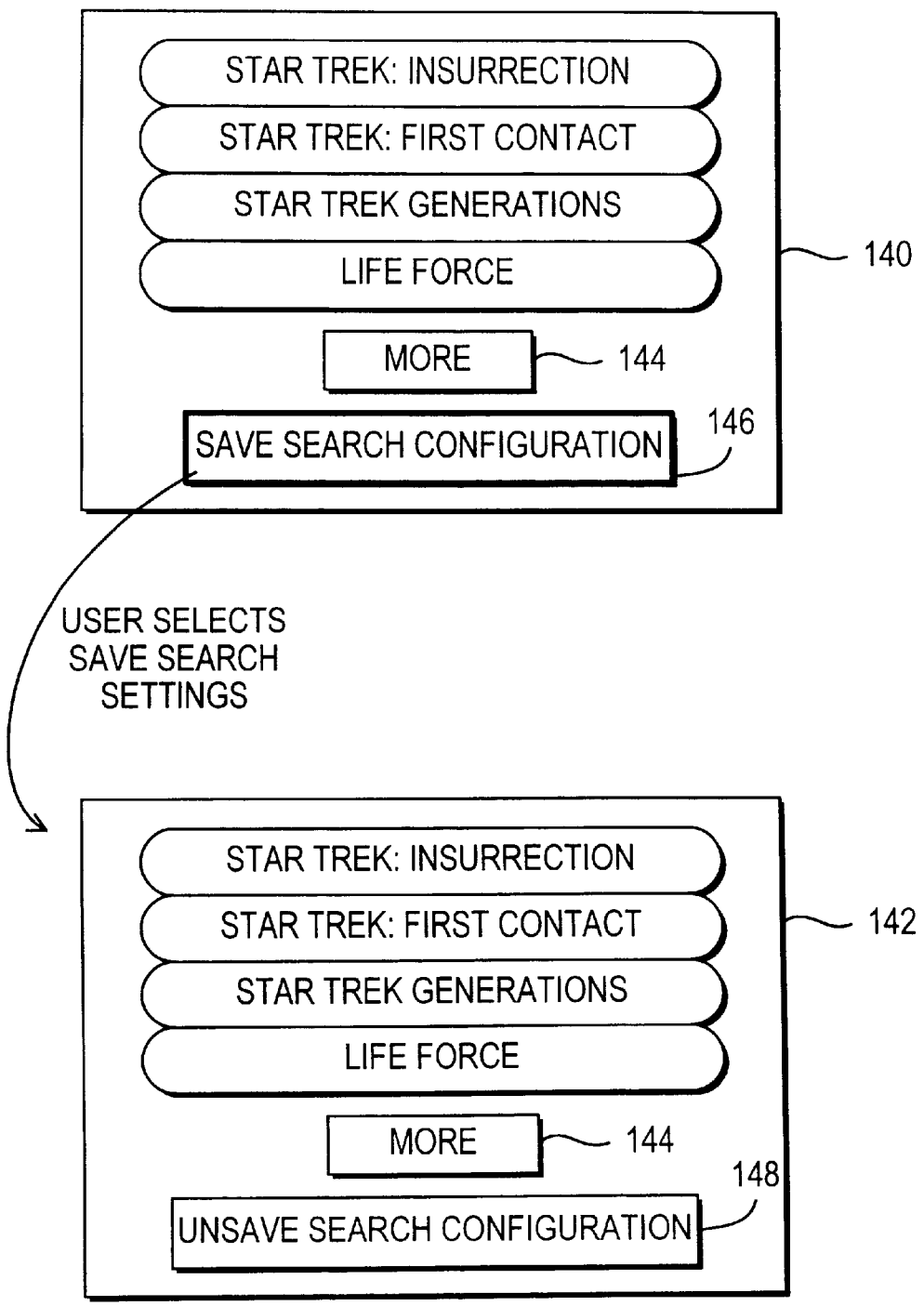
FIG. 7b is a diagram of an illustrative sequence of illustrative display screens for displaying program listings that are related to a given program based on user-selected search parameters in accordance with the present invention.

Illustrative related-program find display screens 140 and 142 of FIG. 7b may be provided based on the illustrative steps of FIG. 6. The program guide may display related-program find display screen 140 when, for example, the user selects the search option from configuration display screen 138 of FIG. 7a. Display screen 140 may include a list of programs that are related to the given program based on the search parameters of configuration display screen 138 of FIG. 7a. The list of related programs in display screen 140 includes the program Lifeforce, which is a science fiction program (a required attribute) starring Patrick Stewart (a required attribute), and includes three Star Trek movies (Insurrection, First Contact, and Generations) that are also science fiction programs starring Patrick Stewart and also starring Jonathan Frakes (a desired attribute). Lifeforce may be displayed at the bottom of the list because the other programs more closely match the user-configured search parameters.

Display screen 140 may include option 144 for displaying more program listings that are related to Star-Trek: The Next Generation based on the user-configured search parameters. Display screen 140 may include save configuration option 146 that provides the user with an opportunity to save the user-configured search parameters. The program guide may display related-program find display screen 142 when the user selects save configuration option 146 of display screen 140. Display screen 142 is the same display screen as display screen 140 except that display screen 142 includes unsave configuration option 148 that provides the user with an opportunity to unsave the user-configured search parameters (e.g., delete the saved user-configured search parameters).

Figure 7C:
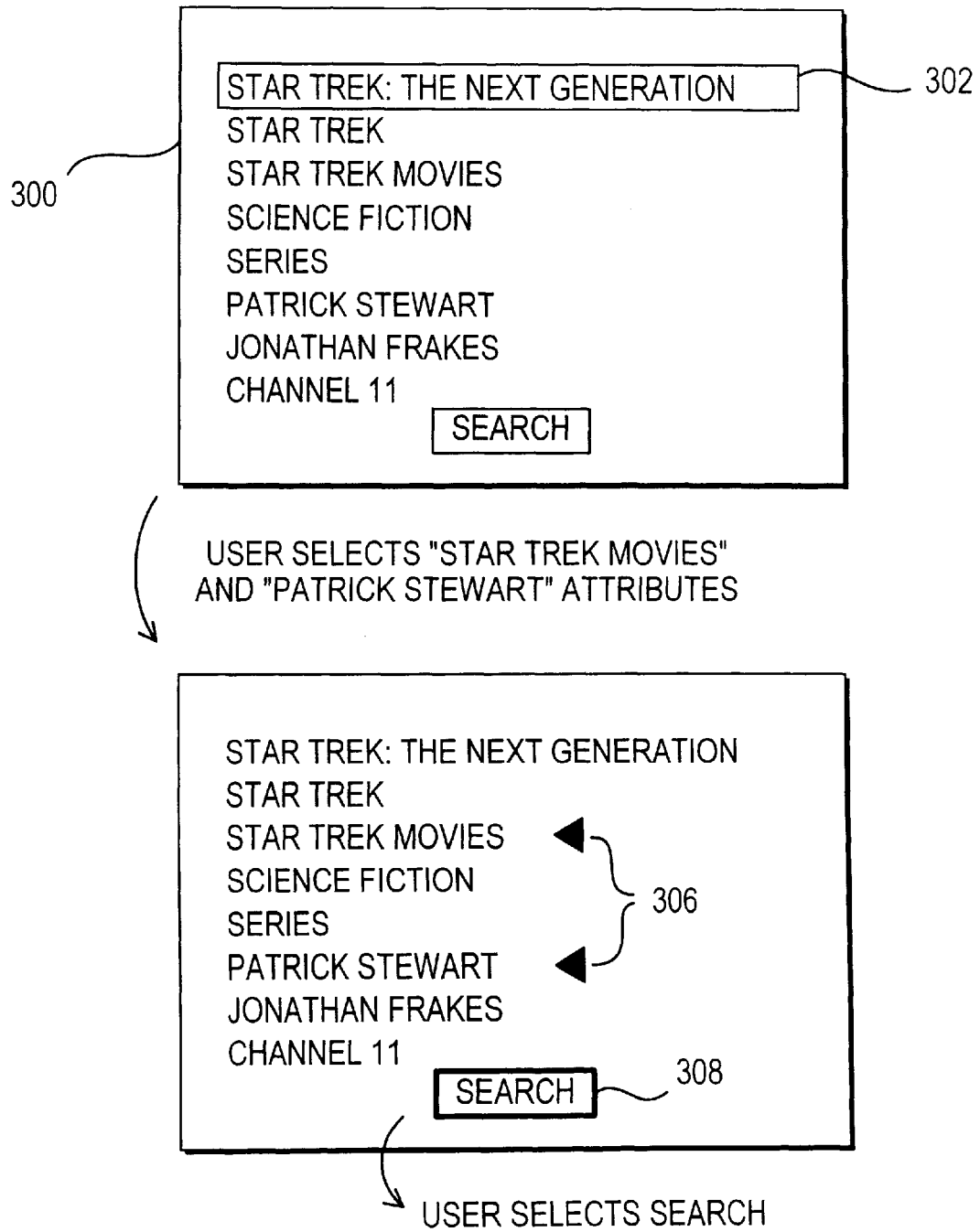
FIG. 7c is a diagram of an illustrative sequence of illustrative display screens for searching for program listings that are related to a given program based on user-selected search parameters in accordance with the present invention.

If desired, an arrangement such as that shown in FIG. 7c may be used to search for related programs. Initially, the user may indicate an interest in a given program by selecting a program listing for the given program from an on-screen display of program listings, by pressing an OK button or other remote control button while tuned to the given program (e.g., while tuned to the given program with a set-top box or the like), by selecting the program from the results of a search, etc.

A list of attributes for the given program (such as the attribute list of display screen 300 of FIG. 7c) may be displayed for the user (e.g., by the program guide or other interactive application running on the system). A moveable highlight region such as highlight region 302 or other such indicator may be used to provide the user with an opportunity to select attributes of interest to be used in searching for related programs.

As shown in display screen 304 of FIG. 7c, the user may select one or more attributes (e.g., by pressing a remote control OK button or otherwise selecting desired attributes). The system may display a visual indication of which program attributes have been scheduled. For example, the system may highlight selected attributes, may change their color, text font, brightness, etc. or may display an indicator such as indicators 306 to indicate which program attributes have been selected by the user. When the user highlights search option 308 and presses a remote control-OK button (or otherwise selects option 308), the system searches for program listings matching the selected program attributes. When plural attributes are selected, the search may be performed using a logical AND or a logical OR function. The search results may be displayed using any suitable on-screen arrangement and may be selectable (for more information, automatic tuning, etc.) if desired.

The arrangement of FIG. 7c is merely illustrative. Any suitable arrangement may be used for providing an on-screen display of program attributes related to a selected program. The attributes may include program genre(s), actors, rating, channel, director, year produced, or any other suitable program attributes. The program attribute information may be provided with the program listings data. In a client-server arrangement, for example, the program attributes may be maintained with program listings data stored on a server located at a cable system headened (or at another suitable location). In configurations in which program listings are stored locally on a set-top box or other user equipment, program attributes may be maintained locally.

Figure 8A:
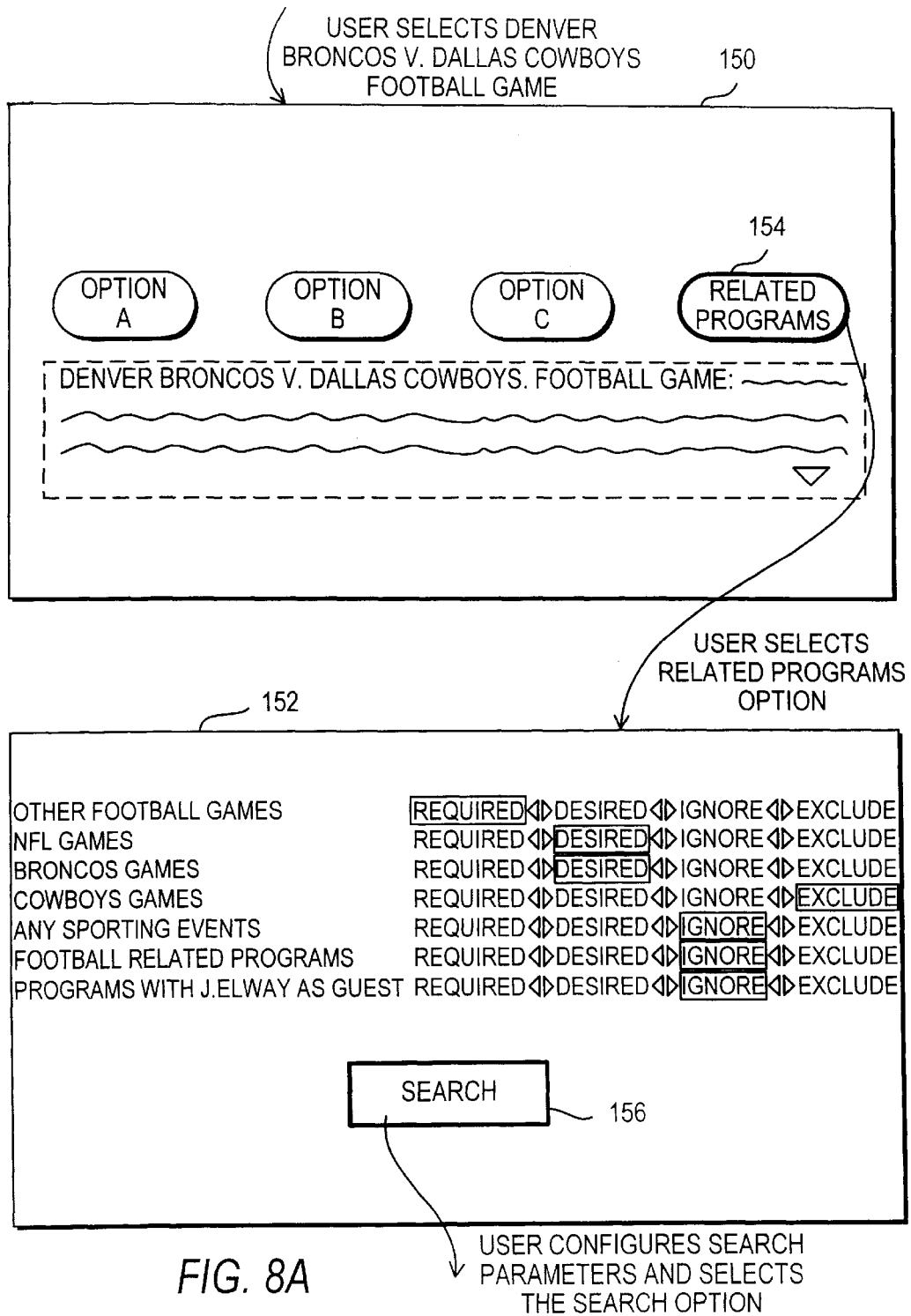
FIG. 8a is a diagram of an illustrative sequence of illustrative display screens for searching for program listings that are related to a given program based on user-selected search parameters in accordance with the present invention.

Illustrative information display screen 150 and illustrative related-program find search configuration display screen 152 (hereinafter, configuration display screen 152) of FIG. 8a may be provided based on the illustrative steps of FIG. 6. The program guide may display information display screen 150 when a user selects to receive information on the Denver Broncos v. Dallas Cowboys football game. Information display screen 150 may include related programs option 154 that provides the user with an opportunity to request that the system locate programs that are related to the Denver Broncos v. Dallas Cowboys football game. The program guide may display configuration display screen 152 when the user selects the related programs options from information display screen 150. Configuration display screen 152 may include an on-screen list of program attributes that are to be configured by the user.

The on-screen program attributes may differ based on the specifics of the given program and based on the category for the given program. For example, for a sports category program, the on-screen list may include attributes that are specific to that sports program and/or include attributes that are related to sports programs in general. As shown, configuration display screen 152 may include the following attributes: other football games, NFL games, Broncos games, Cowboys games, any sporting events, football-related programs, programs with John Elway as guest, etc. The user may then configure the search parameters to require matching programs to be football games, desire NFL games and Broncos games, exclude Cowboys games, ignore whether a program is a sporting event when deciding whether it matches, ignore whether a program is a football related program when deciding whether it matches, and ignore whether a program has John Elway as guest when deciding whether it matches.

Figure 8B:
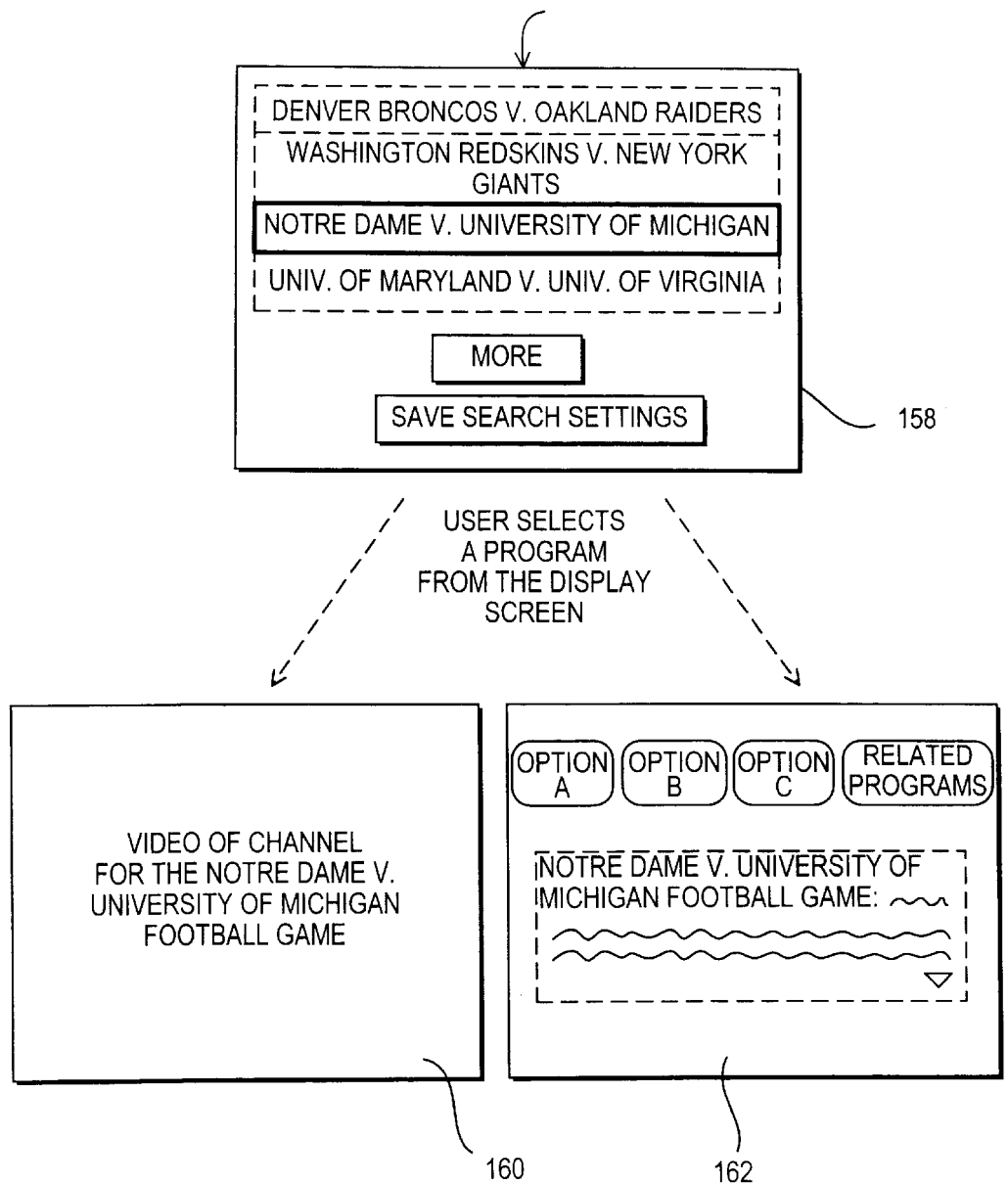
FIG. 8b is a diagram of an illustrative sequence of illustrative display screens for selecting a program listing that is related to a user-selected program in accordance with the present invention.

Illustrative related program find display screen 158 of FIG. 8b may be provided based on the illustrative steps of FIG. 6. Display screen 158 may be displayed when a user selects search option 156 from configuration display screen 152 of FIG. 8a. Display screen 158 of FIG. 8b may include listings that are sorted for display based on the user-configured search parameters of configuration display screen 158. The program guide may display program display screen 160 that contains video of a current program when the user selects a listing for a current program from the program listings contained in related-program find display screen 158. If desired, the program guide may display information display screen 162 for a program when the user selects a program listing from the program listings contained in related-program find display screen 158.

If desired, the listings in related-program find display screen 158 may include program title, air time, channel, rating, pay-per-view information, etc.

Figure 9:
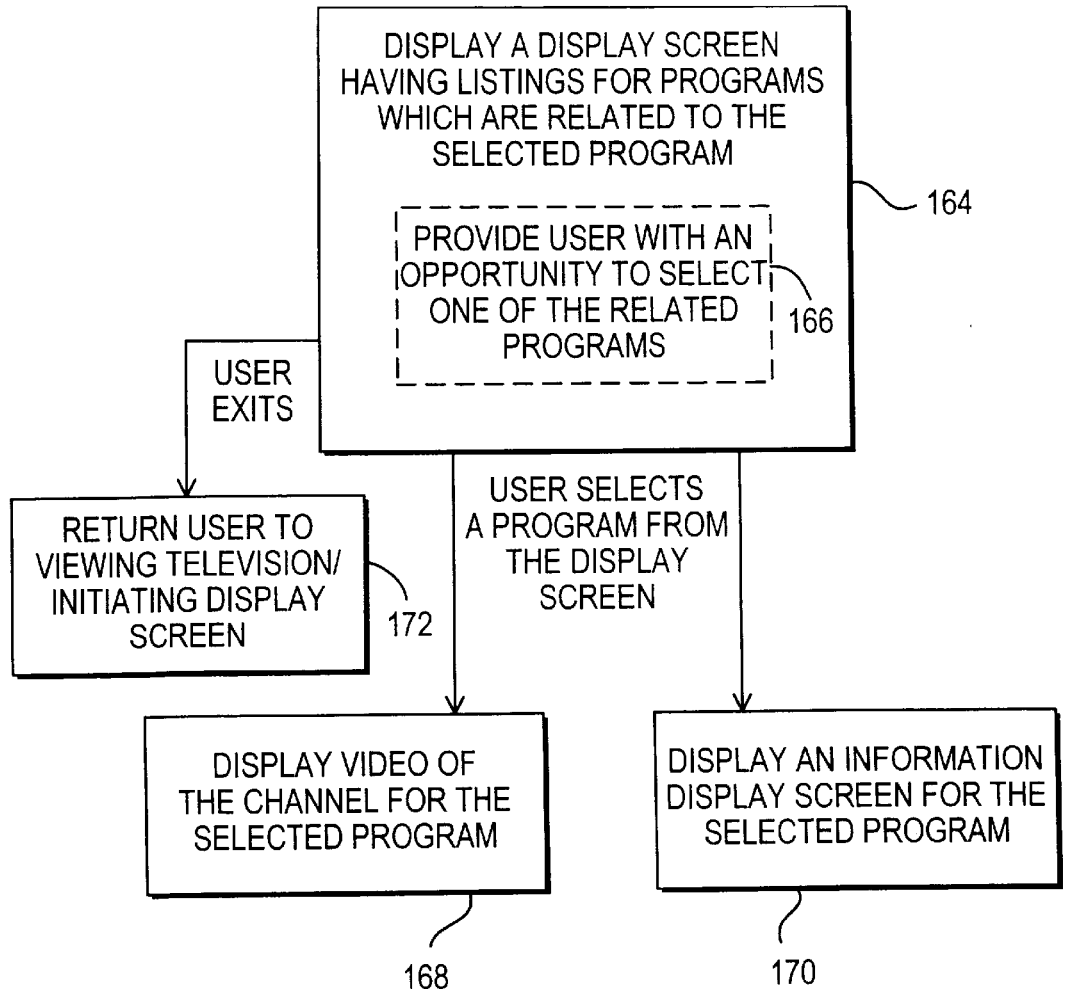
FIG. 9 is a flow chart of illustrative steps involved in providing display screens when a user makes selections from a related-program find display screen in accordance with the present invention.

Illustrative steps for an interactive television system such as interactive television program guide system 50 of FIG. 1 involved in providing the illustrative display screens of FIG. 8b are shown in FIG. 9. At step 164, the program guide may display a display screen having on-screen program listings that are related to a given program. Step 164 may include step 166 in which the program may provide the user with an opportunity to select one of the on-screen program listings. At step 168, the program guide may tune to a channel for a current program when the user selects one of the on-screen listings that is for a current program. At step 170, the program guide may display an information display screen for a selected on-screen listing when the user selects that on-screen listing. At step 172, the program guide may return the user to viewing television or to an earlier display screen when the user exits from the display screen having the related on-screen program listings (e.g., presses an exit or back key of a remote control).

Figure 10A:
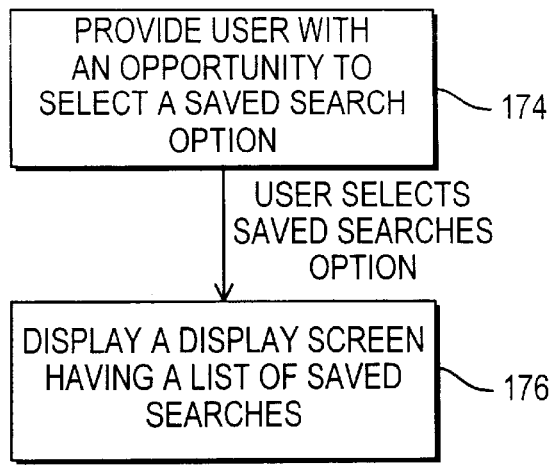
FIG. 10a is a flow of illustrative steps involved in displaying a display screen having a list of saved searches in accordance with the present invention.

Illustrative steps for an interactive television system such as interactive television program guide system 50 of FIG. 1 involved in displaying a list of saved searches are shown in FIG. 10a. At step 174, the program guide may provide the user with an opportunity to select a saved search option. At step 176, the program guide may display a display screen having a list of saved searches when a user selects the saved search option.

Figure 10B:
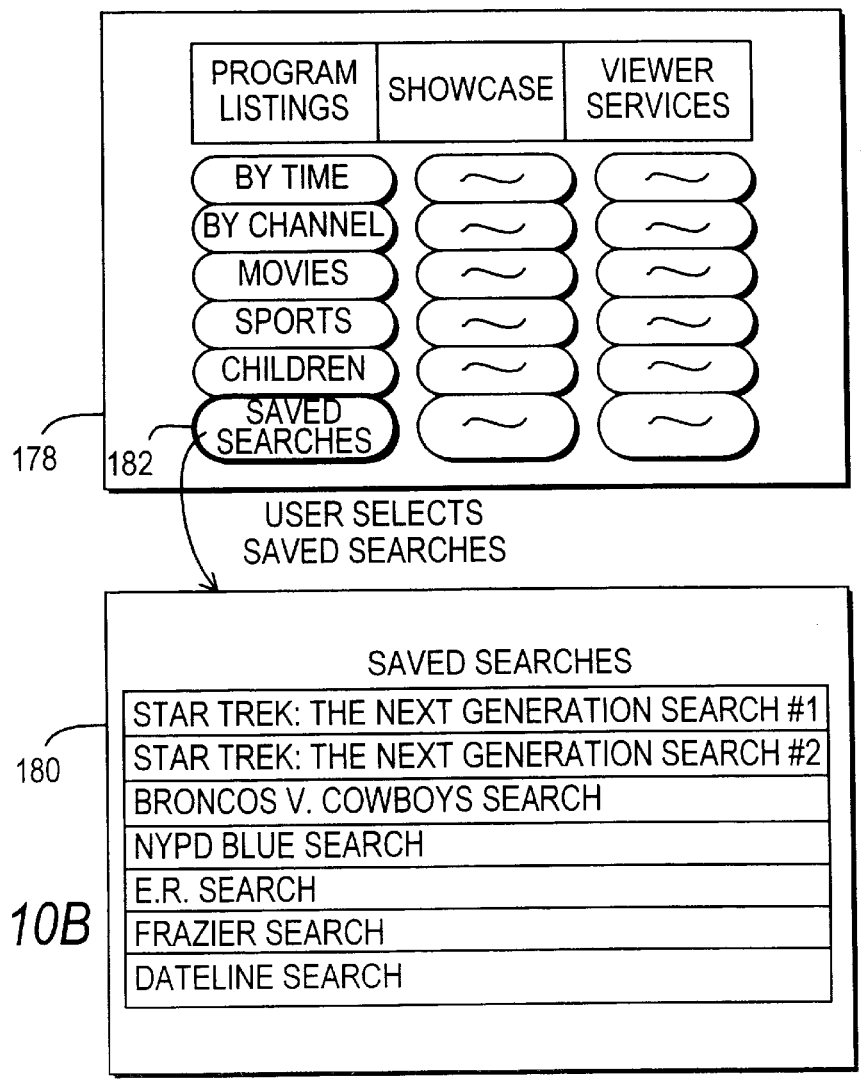
FIG. 10b is a diagram of an illustrative sequence of illustrative display screens for providing a display screen having a list of saved searches in accordance with the present invention.

Illustrative main menu display screen 178 and illustrative saved searches display screen 180 of FIG. 10b may be provided based on the illustrative steps of FIG. 10a. The program guide may display main menu display screen 178 to provide a main selection menu for accessing program guide features. Main menu display screen 178 may include saved searches option 182. The program guide may display saved searches display screen 180 when the user selects saved searches option 182. Saved searches display screen 180 may include a list of saved-searches that are identified on the screen using the given program title for each saved search. When two saved searches are for two programs with the same title, the program guide may use numbering to distinguish the listings. If desired, the user may have been allowed to name the saved searches. For example, the program guide may have provided the user with an opportunity to enter a name (e.g., by selecting or entering alphanumeric letters with a user interface device) for a search that a user is directing the program guide to save. The saved searches may be selected by the user to provide the user with an opportunity to search current program listings using search parameters that were user-configured in an earlier search of program listings.

Figure 11:
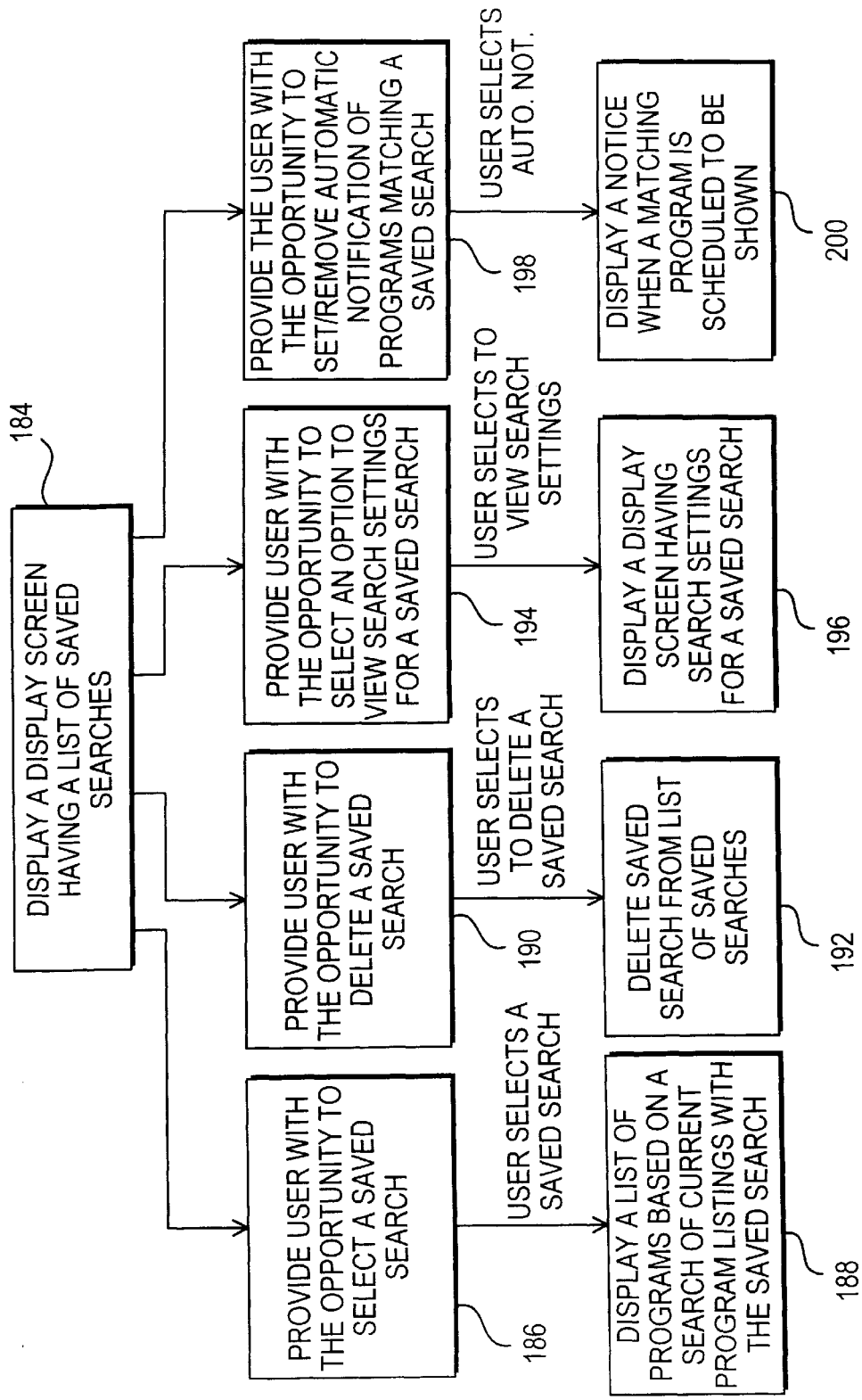
FIG. 11 is flow chart of illustrative involved in providing saved search features in accordance with the present invention.

Illustrative steps for an interactive television system such as interactive television program guide system 50 of FIG. 1 involved in displaying a list of saved searches are shown in FIG. 11. At step 184, the program guide may display a display screen having a list of saved searches. At step 186, the program guide may provide a user with an opportunity to select a saved search. At step 188, the program guide may display a list of programs based on a search of currently available program listings with saved search parameters from an earlier search.

At step 190, the program guide may provide the user with an opportunity to delete a saved search from the list of saved searches. At step 192, the program guide may delete a particular saved search when the user selects to delete that particular saved search.

At step 194, the program guide may provide the user with an opportunity to select an option to view user-configured search parameters for a saved search. At step 196, the program guide may display a display screen having user-configured search parameters for a saved search when the user selects to view user-configured search parameters for that saved search. If desired, step 196 may include a step that provides the user with the opportunity to modify the save searches.

At step 198, the program guide may provide the user with an opportunity to set (or remove) an automatic notification for programs that have been located using a saved search. At step 200, the program guide may display a notice that a located program is scheduled to air when the user has selected to receive automatic notifications. If desired, step 200 may include a step that provides the user with the opportunity to act on it.

Figure 12:
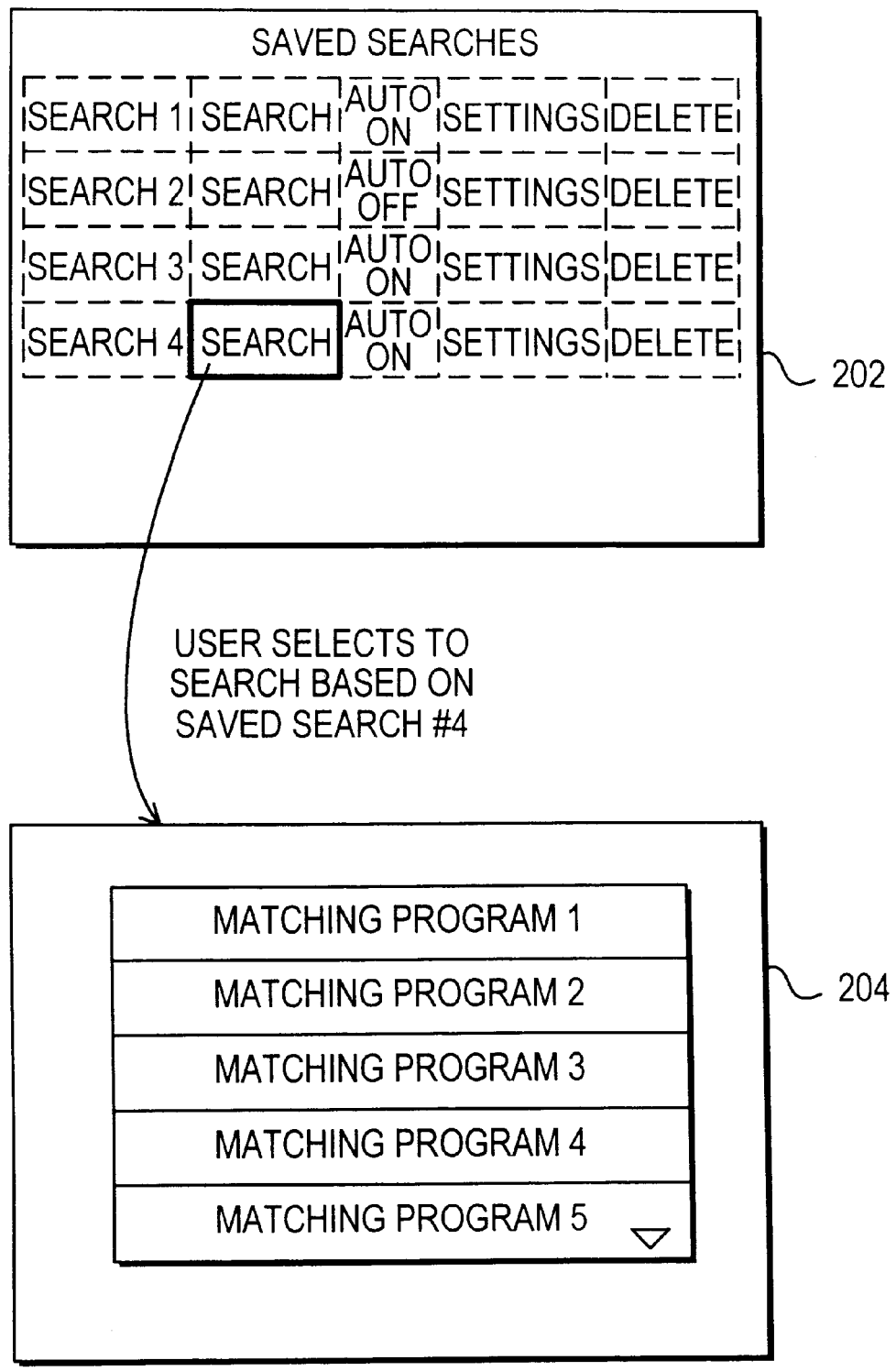
FIG. 12 is a diagram of an illustrative sequence of illustrative display screens for searching for program listings based on a saved search in accordance with the present invention.

Illustrative saved searches display screen 202 and illustrative related-program find display screen 204 of FIG. 12 may be provided based on the illustrative steps of FIG. 11. Saved searches display screen 202 may include a list of saved searches and corresponding options, including a search option, for each saved search. The program guide may display related program find display screen 204 when the users selects the search option for Search #4. Related program find display screen 204 may include a list of current program listings based on the user-configured search parameters for Search #4.

Figure 13:
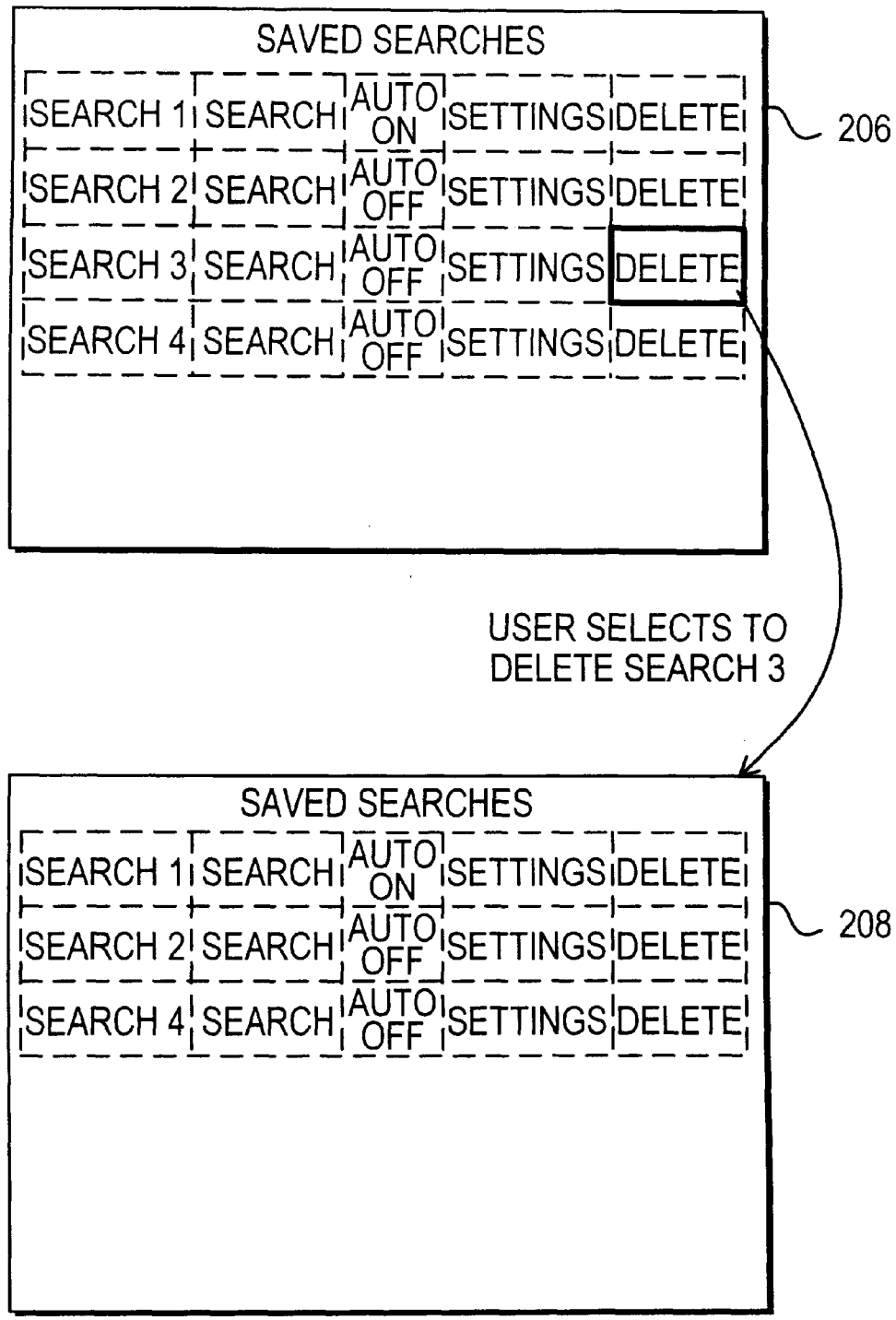
FIG. 13 is a diagram of an illustrative sequence of illustrative display screens for deleting a saved search in accordance with the present invention.

Illustrative saved searches display screens 206 and 208 of FIG. 13 may be provided based on the illustrative steps of FIG. 11. The program guide may display saved searches display screen 206 that includes a delete option for Search #3. The program guide may display saved searches display screen 208 that does not include Search #3 when the user selects the delete option for Search #3.

Figure 14:
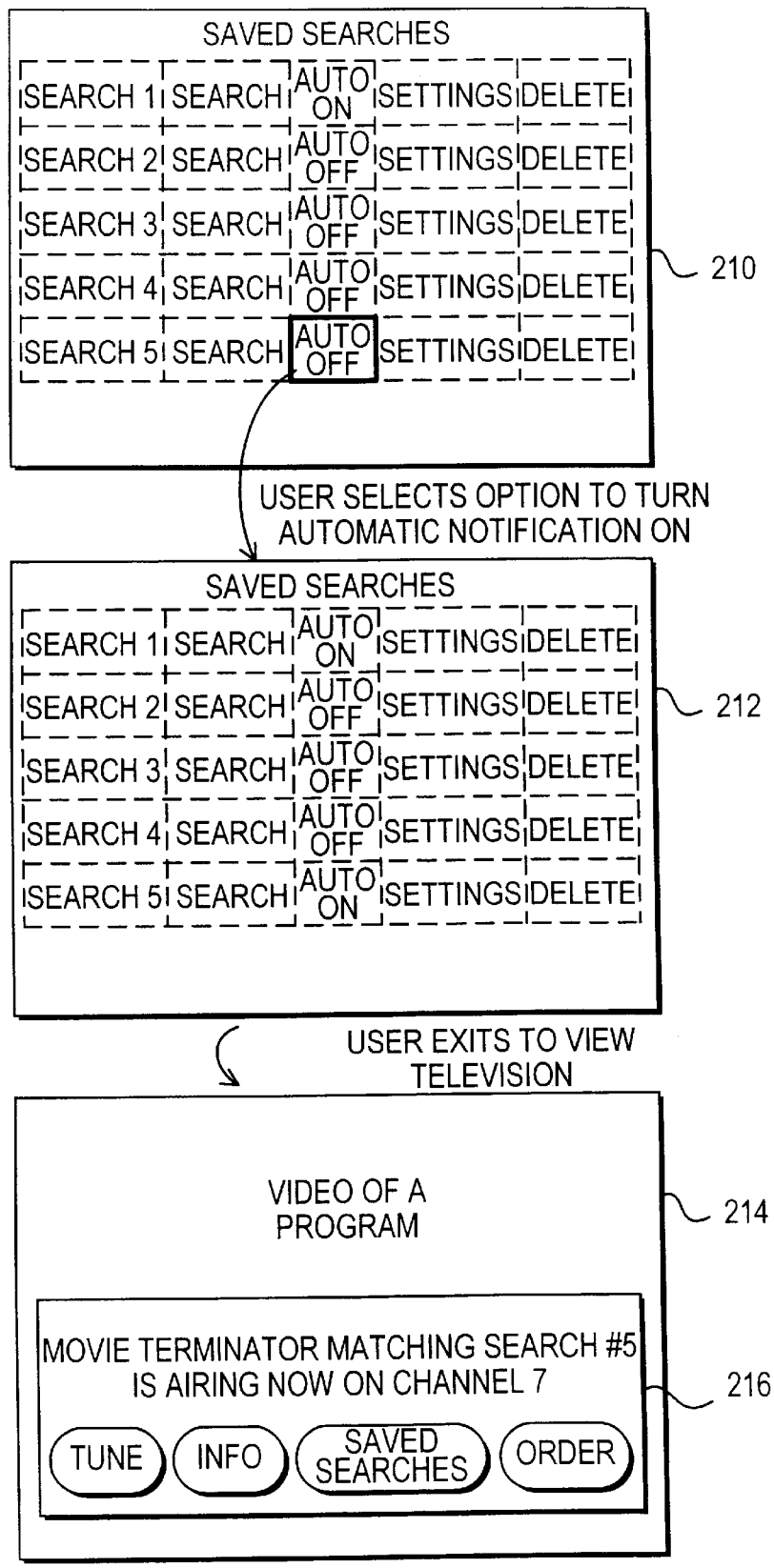
FIG. 14 is a diagram of an illustrative sequence of illustrative display screens for providing an automatic notification of a program matching a saved search in accordance with the present invention.

Illustrative display screen 214 and illustrative saved searches display screens 210 and 212 of FIG. 14 may be provided based on the illustrative steps of FIG. 11. The program guide may display saved searches display screen 210 that includes an automatic notification option for saved searches including Search #5. The automatic notification option for search #5 may initially be off. The program guide may display saved searches display screen 212 that includes an indication that the automatic notification for Search #5 is on when the user selects the automatic notification option for Search #5 from display screen 210. After the user exits saved searches display screen 212 and resumes watching television, the program guide may display automatic notification overlay 216 in display screen 214 when the program guide locates a program (e.g., the movie Terminator) using the user-configured search parameters for Search #5. If desired, the program guide may provide a notification display screen for the located program. The notification may be displayed when the program is about to air or is airing. The overlay 216 may include a tune option (for tuning to the channel airing that program), an information option (for display further information on that program), a saved searches option (for displaying a saved searches display screen), an order option (for ordering programs), etc.

Figure 15:
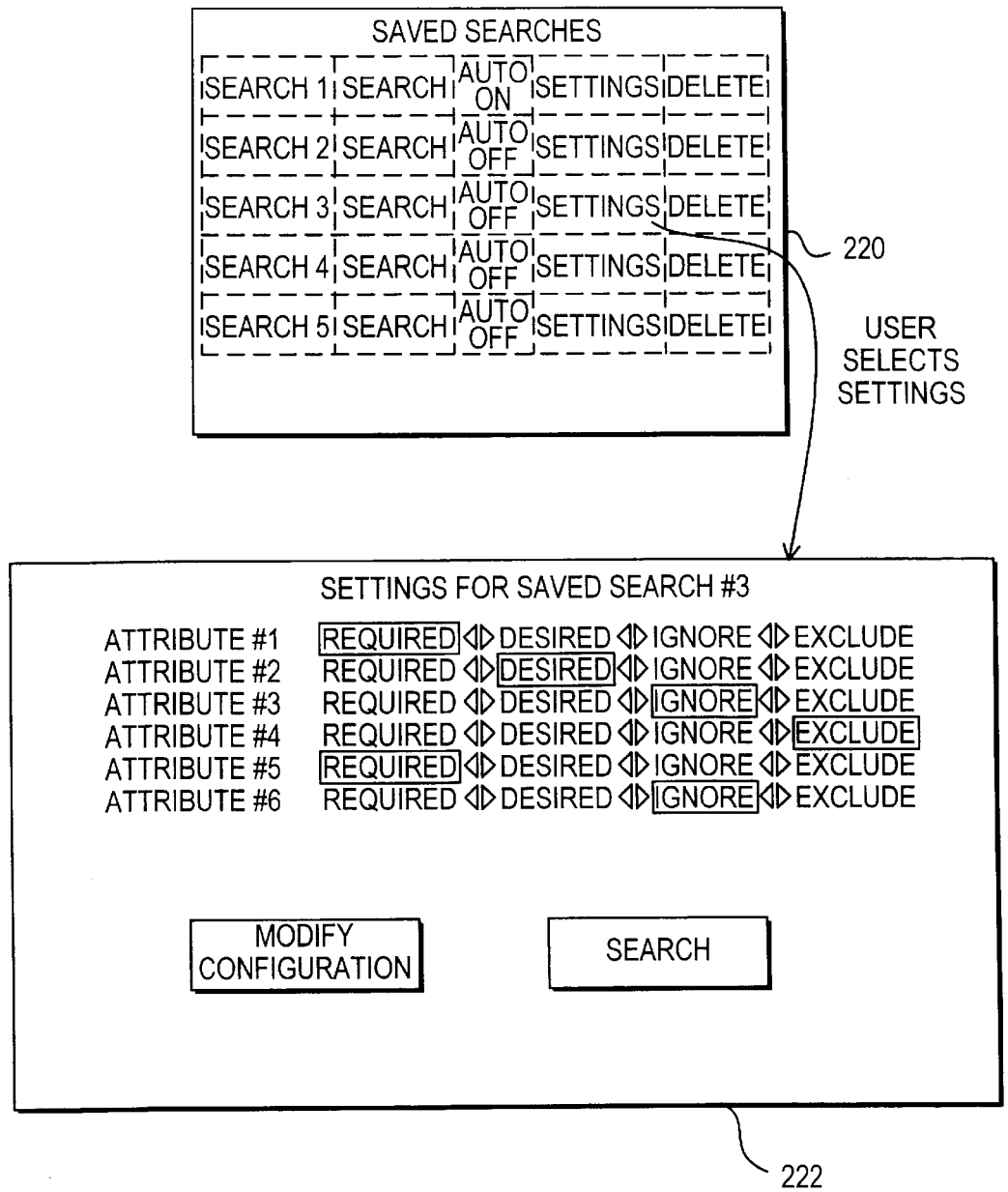
FIG. 15 is a diagram of an illustrative sequence of illustrative display screens for displaying search parameters for a saved search in accordance with the present invention.

Illustrative saved searches display screen 218 and illustrative saved search configuration display screen 220 of FIG. 15 may be provided based on the illustrative steps of FIG. 11. The program guide may display saved searches display screen 220 having an option that provides the user with an opportunity to view search parameters for saved searches. The program guide may display saved search configuration display screen 222 for Search #3 when the user selects the option to view search parameters for Search #3. Saved search configuration display screen 222 may display the saved user-configured search parameters for Search #3, a modify configuration option (to allow the user to adjust the search parameters), and a search option (to search the current program listings based on the user-configured search parameters). If desired, the program guide may provide the user with an opportunity to modify the settings on this screen by highlighting and changing them, rather than having to first select a "modify" option.

Figure 16:
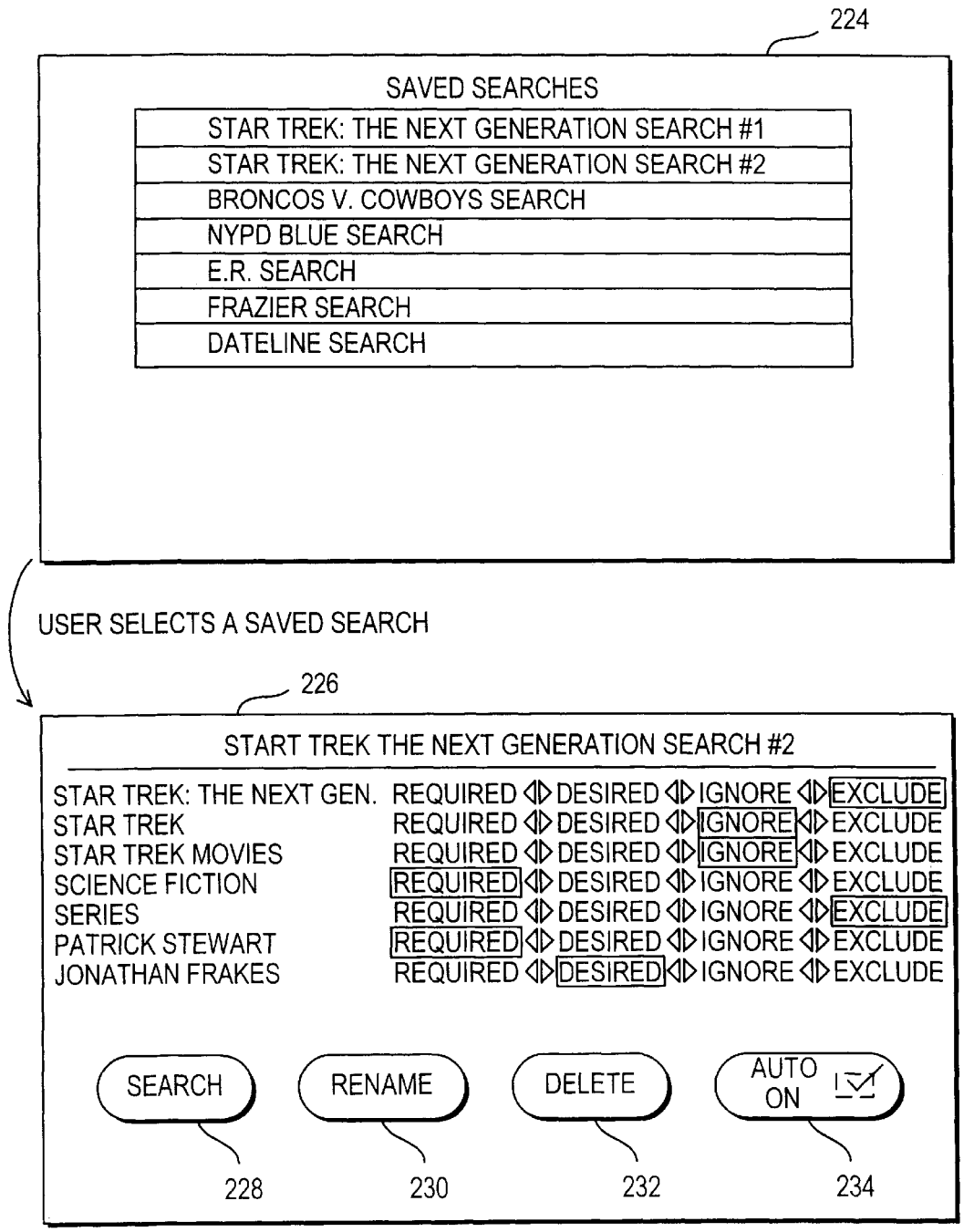
FIG. 16 is a diagram of an illustrative sequence of illustrative display screens for providing save search features in accordance with the present invention.

Illustrative saved searches display screen 224 and illustrative saved search configuration display screen 226 of FIG. 16 may be provided based on the illustrative steps of FIG. 11. The program guide may display saved searches display screen 224 that includes a list of saved searches when a user selects a saved searches option (e.g., saved searches option 182 of FIG. 10b). The program guide may display saved search configuration display screen 226 when the user selects a saved search from saved searches display screen 224. Saved search configuration display screen 226 may include on-screen search settings for the selected saved search. The program guide may provide the user with an opportunity to navigate to any of the settings and to modify them. Saved search configuration, display screen 226 may include search option 228 that when selected, causes the program guide to display a list of matching programs, rename option 230 that allows the user to enter a name (or modify the name) for the selected saved search, delete option 232 that when selected, deletes the selected save search, automatic notification option 234 that provides an automatic notification of programs matching the selected saved search, etc. Automatic Notification option 234 may include an indicator 236 to indicate that option 234 is on.

The foregoing is merely illustrative of the principles of this invention and various modifications can be made by those skilled in the art without departing from the scope and spirit of the invention.

What is claimed is:

1. A method for use in an interactive television program guide system having user television equipment and a remote control for interfacing with said user television equipment, said method being for searching for programs, comprising:
   displaying a display screen that includes a video for a given program;
   allowing the user to use a single key on the remote control while the video for the given program is being displayed to direct the program guide system to display a display screen containing a plurality of program attributes for the given program;
   providing the user with an opportunity to assign various importance levels to the program attributes on the display screen; and
   displaying a selectable search option on the same display screen as the program attributes and assigned importance levels that the user selects to direct the program guide system to locate program listings related to the given program based on the program attributes and their assigned importance levels.

2. The method defined in claim 1, further comprising providing the user with an opportunity to have the program guide system save the plurality of program attributes for the given program.

3. The method defined in claim 2, further comprising providing the user with an opportunity to have the program guide system save the plurality of program attributes for the given program and their assigned importance levels.

4. The method defined in claim 2, further comprising providing the user with an opportunity to delete the saved plurality of program attributes for the given program.

5. The method defined in claim 1, further comprising displaying a list of program listings that the program guide system located based on the attributes and their assigned importance levels.

6. The method defined in claim 5 further comprising providing the user with an opportunity to select program listings from the list.

7. The method defined in claim 6, further comprising displaying information related to a particular program listing that has been selected from the list.

8. The method defined in claim 6, further comprising tuning to a particular program when a listing for the particular program is selected from the list.

9. An interactive television program guide system, comprising:
   a remote control that is configured to interface with user television equipment; and
   user television equipment on which an interactive television program guide is at least partially implemented, wherein the user television equipment is configured to display a display screen that includes a video for a given program, to allow the user to use a single key on the remote control while the video for the given program is being displayed to direct the program guide system to display a display screen containing a plurality of program attributes for the given program, to provide the user with an opportunity to assign various importance levels to the program attributes on the display screen, and to display a selectable search option on the same display screen as the program attributes and assigned importance levels that the user selects to direct the program guide system to locate program listings related to the given program based on the program attributes and their assigned importance levels.

10. The system defined in claim 9, wherein the user television equipment is further configured to provide the user with an opportunity to have the program guide system save the plurality of program attributes for the given program.

11. The system defined in claim 10, wherein the user television equipment is further configured to provide the user with an opportunity to have the program guide system save the plurality of program attributes for the given program and their assigned importance levels.

12. The system defined in claim 10, wherein the user television equipment is further configured to provide the user with an opportunity to delete the saved plurality of program attributes for the given program.

13. The system defined in claim 9, wherein the user television equipment is further configured to display a list of program listings that the program guide system located based on the attributes and their assigned importance levels.

14. The system defined in claim 13, wherein the user television equipment is further configured to provide the user with an opportunity to select program listings from the list.

15. The system defined in claim 14, wherein the user television equipment is further configured to display information related to a particular program listing that has been selected from the list.

16. The system defined in claim 14, wherein the user television equipment is further configured to tune to a particular program when a listing for the particular program is selected from the list.

17. An interactive television program guide system having user television equipment and a remote control for interfacing with said user television equipment, the system comprising:

means for displaying a display screen that includes a video for a given program;

means for allowing the user to use a single key on the remote control while the video for the given program is being displayed to direct the program guide system to display a display screen containing a plurality of program attributes for the given program;

means for providing the user with an opportunity to assign various importance levels to the program attributes on the display screen; and means for displaying a selectable search option on the same display screen as the program attributes and assigned importance levels that the user selects to direct the program guide system to locate program listings related to the given program based on the program attributes and their assigned importance levels.

18. The system defined in claim 17, further comprising means for providing the user with an opportunity to have the program guide system save the plurality of program attributes for the given program.

19. The system defined in claim 8, further comprising means for providing the user with an opportunity to have the program guide system save the plurality of program attributes for the given program and their assigned importance levels.

20. The system defined in claim 18, further comprising means for providing the user with an opportunity to delete the saved plurality of program attributes for the given program.

21. The system defined in claim 17, further comprising means for displaying a list of program listings that the program guide system located based on the attributes and their assigned importance levels.

22. The system defined in claim 21 further comprising means for providing the user with an opportunity to select program listings from the list.

23. The system defined in claim 22, further comprising means for displaying information related to a particular program listing that has been selected from the list.

24. The system defined in claim 22, further comprising means for tuning to a particular program when a listing for the particular program is selected from the list.

25. A machine-readable medium for use in searching for television program listings, comprising machine program logic recorded thereon for:

displaying a display screen that includes a video for a given program;

allowing the user to use a single key on the remote control while the video for the given program is being displayed to direct the program guide system to display a display screen containing a plurality of program attributes for the given program;

providing the user with an opportunity to assign various importance levels to the program attributes on the display screen; and displaying a selectable search option on the same display screen as the program attributes and assigned importance levels that the user selects to direct the program guide system to locate program listings related to the given program based on the program attributes and their assigned importance levels.

26. The machine-readable medium of claim 25, further comprising machine program logic recorded thereon for providing the user with an opportunity to have the program guide system save the plurality of program attributes for the given program.

27. The machine-readable medium of claim 26, further comprising machine program logic recorded thereon for providing the user with an opportunity to have the program guide system save the plurality of program attributes for the given program and their assigned importance levels.

28. The machine-readable medium of claim 26, further comprising machine program logic recorded thereon for providing the user with an opportunity to delete the saved plurality of program attributes for the given program.

29. The machine-readable medium of claim 25, further comprising machine program logic recorded thereon for displaying a list of program listings that the program guide system located based on the attributes and their assigned importance levels.

30. The machine-readable medium of claim 29, further comprising machine program logic recorded thereon for providing the user with an opportunity to select program listings from the list.

31. The machine-readable medium of claim 30, further comprising machine program logic recorded thereon for displaying information related to a particular program listing that has been selected from the list.

32. The machine-readable medium of claim 30, further comprising machine program logic recorded thereon for tuning to a particular program when a listing for the particular program is selected from the list.

* * * * *

UNITED STATES PATENT AND TRADEMARK OFFICE
CERTIFICATE OF CORRECTION

| | | |
|---|---|---|
| PATENT NO. | : 6,865,746 B1 | Page 1 of 1 |
| APPLICATION NO. | : 09/451612 | |
| DATED | : March 8, 2005 | |
| INVENTOR(S) | : W. Benjamin Herrington et al. | |

It is certified that error appears in the above-identified patent and that said Letters Patent is hereby corrected as shown below:

Column 15, line 38, change "8" to --18--.

Signed and Sealed this

Twenty-seventh Day of May, 2008

JON W. DUDAS
*Director of the United States Patent and Trademark Office*